(12) United States Patent
Williams

(10) Patent No.: US 10,384,618 B2
(45) Date of Patent: Aug. 20, 2019

(54) CARGO CARRIER

(71) Applicant: Marty Williams, Colorado Springs, CO (US)

(72) Inventor: Marty Williams, Colorado Springs, CO (US)

(*) Notice: Subject to any disclaimer, the term of this patent is extended or adjusted under 35 U.S.C. 154(b) by 0 days.

(21) Appl. No.: 14/546,993

(22) Filed: Nov. 18, 2014

(65) Prior Publication Data
US 2015/0083769 A1 Mar. 26, 2015

Related U.S. Application Data

(63) Continuation-in-part of application No. 11/697,294, filed on Apr. 5, 2007, now Pat. No. 8,899,456.

(51) Int. Cl.
*B60R 9/00* (2006.01)
*B60R 9/06* (2006.01)
*B60R 9/10* (2006.01)

(52) U.S. Cl.
CPC ............... *B60R 9/06* (2013.01); *B60R 9/10* (2013.01); *Y10S 224/924* (2013.01)

(58) Field of Classification Search
CPC .... B60R 9/06; B60R 9/08; B60R 9/10; B60R 11/00; Y10S 224/924
USPC ............... 224/501, 510, 519, 521, 528, 924
See application file for complete search history.

(56) References Cited

U.S. PATENT DOCUMENTS

| | | | | |
|---|---|---|---|---|
| 640,736 | A * | 1/1900 | Biester | B60R 9/06 211/18 |
| 3,204,839 | A * | 9/1965 | Yuda | B60R 9/10 224/324 |
| 5,067,641 | A * | 11/1991 | Johnson | B60R 9/06 224/501 |
| 5,096,102 | A * | 3/1992 | Tolson | B60R 9/06 224/501 |
| 5,181,222 | A * | 1/1993 | Duarte | H01S 3/08004 372/102 |

(Continued)

OTHER PUBLICATIONS

The International Search Report, PCT/US2015/061319, International filing date: Nov. 18, 2015.

(Continued)

*Primary Examiner* — Peter N Helvey
(74) *Attorney, Agent, or Firm* — Tracy Heims; Apex Juris, pllc.

(57) ABSTRACT

A versatile and portable cargo carrier having angularly adjustable members adaptable to various uses and cargo, including recreational, construction, landscaping and other equipment, tools and supplies of diverse sizes and shapes, comprising a base plate and mounting member attachable to a corresponding surface on a vehicle from which two adjustably angled arm members extend outwardly at an angle from the mounting member, a pivoting mechanism for adjusting the angle between the two arm members and one or more cargo fasteners employing fastening mechanisms suitable for corresponding equipment or cargo, and may include a mounting bar. This easily assembled and installed cargo carrier further provides a frame for attachment about a hitch, spare tire, hatchback, and includes mounting members including a base plate, hat bracket, rotational swivel or pivoting tilt base which can be combined with the two angular members enabling facile loading and fastening of cargo.

21 Claims, 29 Drawing Sheets

(56) References Cited

U.S. PATENT DOCUMENTS

| | | | | |
|---|---|---|---|---|
| 5,181,822 A | * | 1/1993 | Allsop | B60R 9/06 224/402 |
| 5,373,978 A | * | 12/1994 | Buttchen | B60R 9/06 224/510 |
| 5,427,286 A | | 6/1995 | Hagerty | |
| 5,497,927 A | * | 3/1996 | Peterson | B60R 9/10 224/519 |
| 5,820,004 A | * | 10/1998 | Lane | B60R 9/06 224/485 |
| 5,950,892 A | * | 9/1999 | Tsai | B60R 9/06 224/497 |
| 6,089,428 A | * | 7/2000 | Wagner | B60R 9/10 224/401 |
| 6,149,039 A | * | 11/2000 | Englander | B60R 9/042 224/310 |
| 6,431,423 B1 | * | 8/2002 | Allen | B60R 9/048 224/324 |
| 6,491,195 B1 | * | 12/2002 | McLemore | B60R 9/06 224/521 |
| 6,662,983 B2 | * | 12/2003 | Lane | B60R 9/06 108/44 |
| 6,695,185 B2 | * | 2/2004 | Church | B60R 9/06 224/521 |
| 2004/0256430 A1 | * | 12/2004 | Wang | B60R 9/06 224/520 |
| 2006/0029483 A1 | * | 2/2006 | Allen | B60R 9/10 410/30 |
| 2007/0007316 A1 | * | 1/2007 | Witczak | B60R 9/042 224/310 |
| 2008/0164292 A1 | * | 7/2008 | Farney | B60R 9/10 224/324 |
| 2011/0240700 A1 | | 10/2011 | Williams | |
| 2012/0000952 A1 | * | 1/2012 | Dreger | B60R 9/10 224/533 |
| 2012/0027560 A1 | * | 2/2012 | Olsen | B60R 9/10 414/800 |

OTHER PUBLICATIONS

LGA Reference 1 and 3, Lets Go Aero VME-V2 Black/Silver Two-Bike Rack for 1.25" and 2" Receiver.

LGA Reference 2, Inventive 9108 Swivel-Loc Hitch Kit.

* cited by examiner

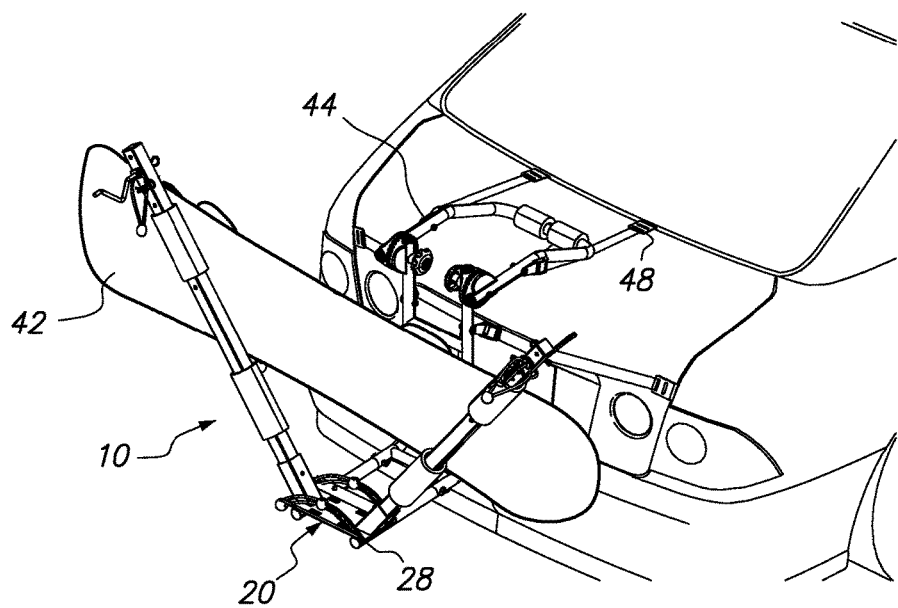
FIG. 2
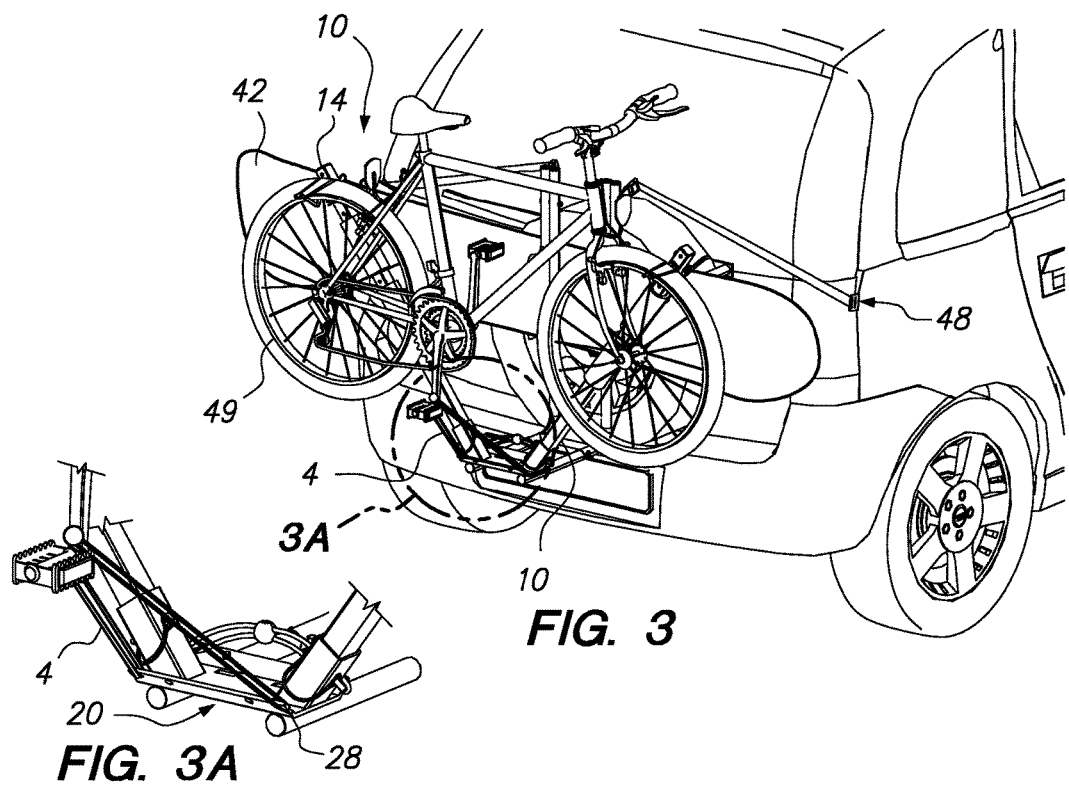
FIG. 3
FIG. 3A

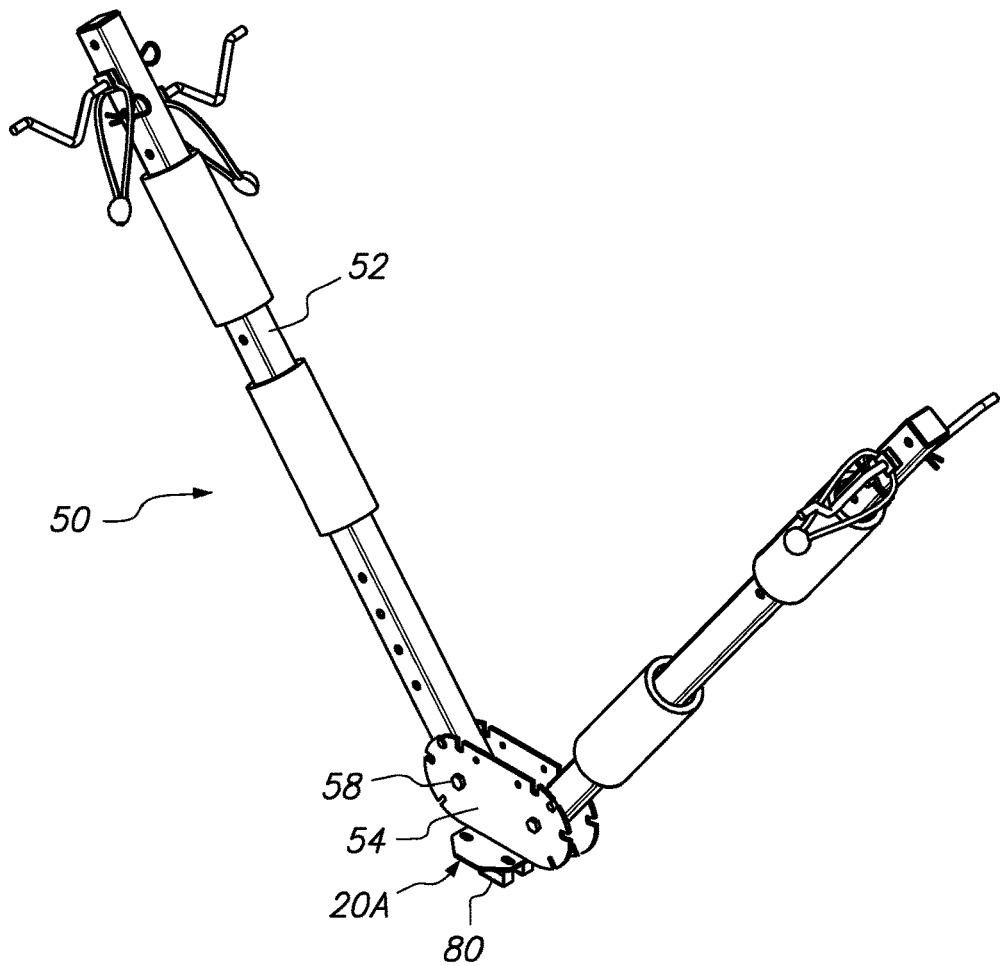
FIG. 8
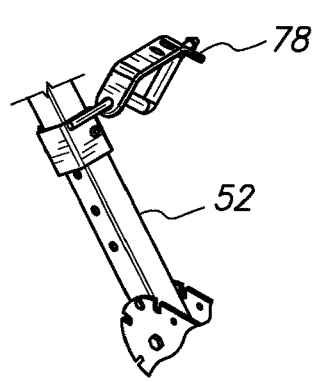 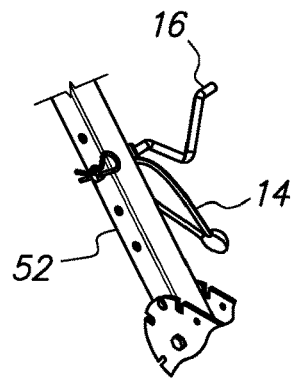
FIG. 8A     FIG. 8B

CARGO CARRIER

CROSS REFERENCE TO RELATED APPLICATION

This continuation in part application claims the benefit of U.S. patent application Ser. No. 11/697,294, filed on Apr. 5, 2007, which is incorporated herein by reference.

FIELD OF THE INVENTION

This invention relates to the field of cargo carriers.

BACKGROUND OF THE INVENTION

There exist numerous bicycle and other cargo carriers that mount to a vehicle or a trailer for transporting cargo from one location to another location. Conventional carriers have mounts adapted to particular roof-tops, trunks, trailers and hitches for a particular vehicle surface or accessory rail, tube or bar and to carry a particular item. Hitch-mounted carriers are popular with SUVs and other vehicles that have hitch or tow tower attachments. Similarly, truck bed carriers are uniquely configured for use in truck beds. The base plate on which such conventional carrier systems are permanently or semi-permanently mounted on the surface, bar or rail to which they correspond, and include securing mechanisms corresponding to a particular piece of equipment, case, or article, and lack adaptability to other types of surfaces or cargo.

For example, hitch mounted carriers typically have a square bar or tube that is fitted to slide into a receiver mounted on the vehicle. A pin engages the bar or tube in the receiver to secure the carrier to the vehicle and a mounting bar is permanently mounted onto the tube with horizontally extending arms onto which a bicycle is secured. These prior art carriers are heavy, and awkward to align and mount onto the vehicle.

Also, these carriers are often not adaptable to alternative applications and thus require different carriers for different cargo types, or even of different cycle species, such as unicycles, road bicycles and mountain bicycles. A further disadvantage of such dedicated systems nature is the consequent increased number of carriers, mounting components and the attendant expense and storage space.

A particular problem with hitch mounted carriers is the use of the vehicle hitch receiver. Since conventional hitch mounted carriers are mounted to the hitch receiver, the vehicle may not be used for another use requiring the hitch receiver. Often it is necessary to use the hitch receiver for other purposes, such as towing a trailer. In that event, such a conventional hitch-mounted carrier cannot be mounted. U.S. patent application Ser. No. 11/697,294 addresses such and other problems relating to hitch-mounted carriers by providing a system with adjustment mechanisms for mounting a bicycle carrier on a shank above a hitch receiver whereby a trailer or other accessory may be connected to the hitch receiver. It further enables cargo to be mounted above and clear of the heat emanating from the exhaust tailpipe of different vehicles.

Other drawbacks of conventional carriers remain, however, many of which derive from their dedicated designs, which are typically adapted to particular vehicle surface and cargo types. Mounting systems for rooftops, sedans, trailers and hitches or hitch receivers, tow towers, or accessory bars corresponding to a particular vehicle type are typically dedicated to particular equipment, gear, case or other species of cargo. As a result, conventional carrier components for trunk or hatchback mounted systems typically cannot be used on roof top, truck bed, bus front, or surface mounted applications. That is, mounting mechanisms and bars for use with framed carriers for trunks and hatchbacks primarily used for cars and other low profile vehicles cannot be interchanged with hitch or tow tower mounted systems popular for SUVs and trucks. Similarly, truck bed carrier mounts are uniquely configured for use in truck beds, and mounts for cargo case containers are configured for locking a particular corresponding case.

Thus, there is a lack of crossover applications for mounting mechanisms and cargo carrier systems enabling portability between vehicles, as well as, rooftop, trunk, and hatchback carriers, hitch-mounted, truck mounted trailer mounted and other carriers. Moreover, conventional cargo carriers lack versatility with regard to cargo. Known dedicated carriers have distinct mounting mechanisms and carrier frames adapted for fastening and transporting particular equipment, gear or other cargo type. For example, ski and snowboard, as well as, surfboard and wakeboard carriers require their own distinct brackets, typically located on a vehicle rooftop. Similarly, cases and containers employ locks and clips limited to mounting systems typically located on vehicle rooftops.

In addition, conventional carrier systems typically employ fixed frames, which cannot be lengthened or angled, and are often molded or otherwise rigidly aligned to specific cargo configurations. With regard to bicycle carriers, even different cycle species, such as unicycles, road bicycles and mountain bicycles may require distinct carriers. For example, conventional hitch mounted carriers typically have welded crossbars with horizontally extending arms positioned to accommodate the frames and handle bars of particular bicycle sizes. Such bicycle carrier frames thus typically are not adaptable to different bicycle or other cycle styles. In addition, conventional carriers are heavy and awkward to align and mount onto the vehicle.

Many drawbacks result from such lack of versatility and portability, including limited or singular application cargo support bars and mounting mechanisms, of prior art cargo carriers. As detailed herein, differing types of equipment and carrier cases have, in the past, required separate and distinct carrier systems with differing mounts. Moreover these mounting devices are limited to specifically corresponding surfaces, tubes or rails; such conventional carriers thus lack portability. Due to their lack of versatility and portability, conventional carriers require multiple and distinct mounts and brackets with limited or a single application suited to particular surfaces, rails or bars, depending on the size and shape of the equipment or other cargo.

Due to their lack of versatility and portability, conventional carriers required multiple and distinct mounts and brackets with limited or a single application suited to particular surfaces, rails or bars, depending on the size and shape of the equipment or other cargo. The multiple and permanent mounting devices added to the disadvantages of such inflexible and non-portable prior art the further drawback of detracting from the aesthetic look of a vehicle and adding weight and aerodynamic obstruction increasing fuel cost.

In sum, there exists nothing in the prior art that provides a lightweight, versatile, readily adjustable and portable carrier adaptable to various vehicles, surfaces, bars and rails or shanks on which carriers are mounted. There is also a lack of mounting mechanisms adaptable to various types, sizes and shapes of cargo, such as, for example, recreational, construction or yard equipment and tools cases between locations. Thus, there persists a need for a cargo carrier system which overcomes such and other limitations, problems and drawbacks.

SUMMARY OF THE INVENTION

The present invention solves these and other problems by providing a versatile and portable carrier for transporting diverse cargo types on various vehicle surfaces, and rails, or shanks. The cargo carrier of the present invention carrier comprises a base plate and mounting member from which two angled arm members extend outwardly at an angle from the mounting member, and a pivoting mechanism for adjusting the angle between the two arm members. A series of spaced holes for receiving one or more cargo fasteners suitable for securing corresponding equipment or cargo types to the carrier may be included on the two arm members. In preferred embodiments of the present invention, arm members are adjustable between angles ranging between zero and ninety degrees. It is particularly preferably that angles between the arm members be set between thirty and sixty degrees, and the angle may be optimally selected to accommodate the size and shape of relevant cargo.

Embodiments employing angular adjustability of the two arm members relative to the mounting bracket and to sections of the two arm members, raises and lowers, as well as, changes the distance between the arm members. Particularly preferred embodiments of the present carrier include telescoping sections of the adjustable arm members. In alternative embodiments of the present invention, arm members may feature an articulating mechanism for adjusting the angle between two telescoped arm members relative to the mounting member, whereby the two telescoped angular arm members are continuously adjustable relative to each other. The present invention further includes embodiments providing fastening mechanisms for securing the telescoping arms in a fixed angular position.

Adjustability of the arm members' length enables changing the height of the members relative to the mounting mechanism, as well as, changing the distance between the arm members. These angularly adjustable members thus impart versatile adaptability of the present cargo carrier to a wide variety of mounting mechanisms and combinations thereof as well as to applications hauling diverse sized and shaped cargo, which may include, without limitation, recreational, construction, landscaping and other equipment, tools and supplies.

In alternative embodiments of the present invention, arm members are sized to telescope tubular sections sized to adjust the extension to sizes commensurate to their respective lengths. This allows not only adjustment of the carrier for differing heights of bicycles but also lengths of bicycles since the arm members are adjusting at an angle.

Potential configurations which may be employed to accommodate various vehicle and cargo types are too numerous and diverse to individually specify. An example of how the present invention accommodates cargo of various sizes comprises its use to transport skis and snowboards of successively shorter lengths which could be aligned across the horizontal axis of the cargo carrier in order of descending lengths from the upper edge to the mounting bracket, the bottom of which could cradle a boot bag with boots secured onto the base plate. Similarly, water sports equipment and gear such as water skis, surfboards, and wake boards of successively descending lengths could be aligned and fastened along the cargo carrier. In other preferred embodiments, pivoting arm members are infinitely adjustable while in alternative preferred embodiments, arm members are adjusted between selected positions.

The carrier according to the present invention is easily assembled and installed on a variety of surfaces including, without limitation, vehicle or trailer surfaces, bars and rails, hitch receivers, tow towers, spare tires mounted on rear exteriors, hatchbacks, rooftop or truck bed bars, or upper surfaces of truck beds, rails, or bus fronts.

As used herein, "vehicle" refers to cars, trucks, trailers and any other vehicle accessory or transport container of suitable size and purpose that can be connected to a vehicle. "A corresponding surface on a vehicle," as used herein, refers not only ro a direct surface of the "vehicle" defined above—it is defined to also include any accessory or extension on a surface of a vehicle suitable for attaching the carrier according to the present invention. Such a corresponding surface refers to rails, bars, tubes, hitch receivers, trailer towers, trailer tongues, as well as, direct vehicle surfaces, such as, for example the top surface of the sidewall forming a bed for a truck or hybrid car/truck vehicle.

As used herein, mounting member refers to fixed or adjustable mechanisms for securing and positioning carriers in accordance with the present invention, including, without limitation, brackets for affixing arm members at predetermined angles, hat brackets for affixing carriers to vehicle surfaces, tilt bracket assemblies for adjustable orientation at predetermined angles of arm members or a bar onto which carriers are fastened, articulating hubs pivotable along a continuum of angles, swivel bases, and mounting bars, shanks and frames. As illustrated in the drawings and described in detail herein, various preferred embodiments of the present invention deploy several mounting members including base plates, brackets such as, for example, a hat bracket or tilt bracket, rotational swivel base, articulating hub, tilt rail, as well as other, mounting and orientation mechanisms in unison or combined in order to accommodate a particular vehicle type or mounting surface, a cargo type, or to position the two angled arm members of the carrier for facile loading, fastening and transport of cargo. Such versatile adaptability and portability of the mounting members according to the present invention thus imparts significant features and advantages thereof.

In particular, alternative embodiments of the invention include a base plate having at least one hole and preferably four holes configured to receive a corresponding bolt or bolts therethrough, aligned with a hole or holes in a corresponding surface on or connected to the vehicle such that tightening the bolt or bolts secures the base plate thereon.

The base plate preferably includes upwardly angled flanges extending from opposing sides of the base plate. In particularly preferred embodiments of the base plate according to the present invention, there is a drain hole between the upwardly angled flanges. Preferred embodiments of the present invention further include a base plate with holes, notches, pockets or protrusions for receiving and securing cargo fasteners. Preferred embodiments of the present invention further include bolt holes for attachment of a base plate to a surface, tube or rail on a vehicle or trailer. Alternatively, the base plate may be permanently secured to the surface, tube or rail by, for example, welding it thereon. With regard to hitch, trailer tower, tailgate, trunk or hatchback mounts, a further advantage is the present inventions ability to be partially disassembled to allow access into the rear of the vehicle without interfering with the vehicle tailgate.

A preferred embodiment of the present invention utilizes a hat bracket configured to receive a corresponding rail on a vehicle such that the hat bracket and the rail are locked into mated engagement when the hat bracket is tightened. Particularly preferred embodiments of the present invention further include a carrier comprising a mounting member, which may comprise a base plate, swivel base, tilt bracket, which have one or more hat brackets attached to a bottom surface thereof.

Embodiments of the present invention bolting the carrier to a base plate, tube or rail or, alternatively, hat bracket mating of the base plate on rails with compatible anchor mechanisms enable portable mounting of this cargo carrier onto various suitably adapted surfaces, tubes, bars or rails on the same or multiple vehicles. An alternative embodiment of the hat bracket is compressible to enable secure attachment to the rail.

Preferred embodiments of the present invention employ mounting members of the present invention enabling orienting a cargo carrier in a position for facile loading, unloading and efficient transport of cargo. Particularly preferred embodiments deploy a rotational swivel base whereby a mounting bracket and any cargo attached thereto can be oriented in any direction along the radial axis of the swivel base.

Alternative embodiments of this invention facilitate convenient or efficient carrier positioning by deploying a tilt bracket pivotable to form varying angles along a vertical planar axis. As with the aforedescribed swivel base, embodiments employing rotational or pivoting tilt brackets enable facile fastening of cargo to the cargo carrier by providing a mechanism whereby a convenient proximal position for fastening and unfastening the cargo can be accessed, pivotal tilting back and forth provided by the latter mounting mechanism further enables orienting the cargo to maximize aerodynamic flow and thereby conserves fuel consumption of the vehicle.

Another aspect of the present invention is provided by alternative embodiments employing various types of fasteners adaptable to differing recreational equipment, tools and other cargo. Such fasteners and supports include, without limitation, cradles for wheels or other suitably shaped structures, hooks, bungees, clamps, clips, clasps and elastomer cords. Fasteners and supports are pinned, looped, clamped or otherwise secured on the cargo carrier to accommodate differing sizes and shapes of the recreational equipment, tools and cargo cases. Adjustment of fasteners and supports along the angular orientation of arm members facilitate versatile adaptation accommodation to differing types, sizes and shapes of cargo.

Features and embodiments of the present invention are numerous and diverse, extending beyond the detailed description and claims herein. For example, mounting members and tubular arms of the present invention can be attached to other surfaces, items and containers not specified herein.

Another feature of a preferred embodiment of the present invention enables adjustment of the height of the arm members and adapting fasteners to enable the cargo on rear of vehicle applications to be mounted well away from the heat of the vehicle tailpipe emission.

Yet an additional feature of the present invention includes a lower cycle wheel retainer system wherein lower portion of a cycle wheel is nested in a collar support pin member or frictionally fastened with an elastomer toggle cord or equivalent securing mechanism to a lower portion of a carrier arm.

The cargo carrier system of another preferred embodiment further contemplates multiple carriers to be mounted onto one another to add additional capacity. Such latter embodiments may include extension shanks that connect carrier systems to one another.

Yet further and alternative embodiments of the present invention include setting angles of arm members and employing fasteners to secure diverse cargo types, including construction and yard equipment, tools and supplies. For example cradles and bungee cords may be secured to holes of the tubular arms and fastened about ladders, garden tools, and construction tools or supplies to the bed of a pickup truck. In addition, a cargo case or box could be fastened and thereby supported by a side surface mount cargo carrier for storage of smaller tools, supplies and construction or yard waste. These and other features of the present invention will be evident from the ensuing description of preferred embodiments along with the drawings.

BRIEF DESCRIPTION OF THE DRAWINGS

FIG. 2 is a perspective view of a preferred embodiment of the present invention in use on a vehicle trunk.

FIG. 3 is a perspective view of a preferred embodiment of the present invention mounted on a vehicle trunk.

FIG. 3A is a close up view of the fastening mechanism circled in FIG. 3.

FIG. 8 is a perspective view of a preferred embodiment of the present invention employing an articulating hub base.

FIG. 8A of a close up view of an alternative embodiment of FIG. 8 employing a bracket for use as a lower wheel retainer.

FIG. 8B is a close up view of the lower cycle wheel of FIG. 8 employing a collar support and toggle cord.

DETAILED DESCRIPTION OF PREFERRED EMBODIMENTS

Figure 1:
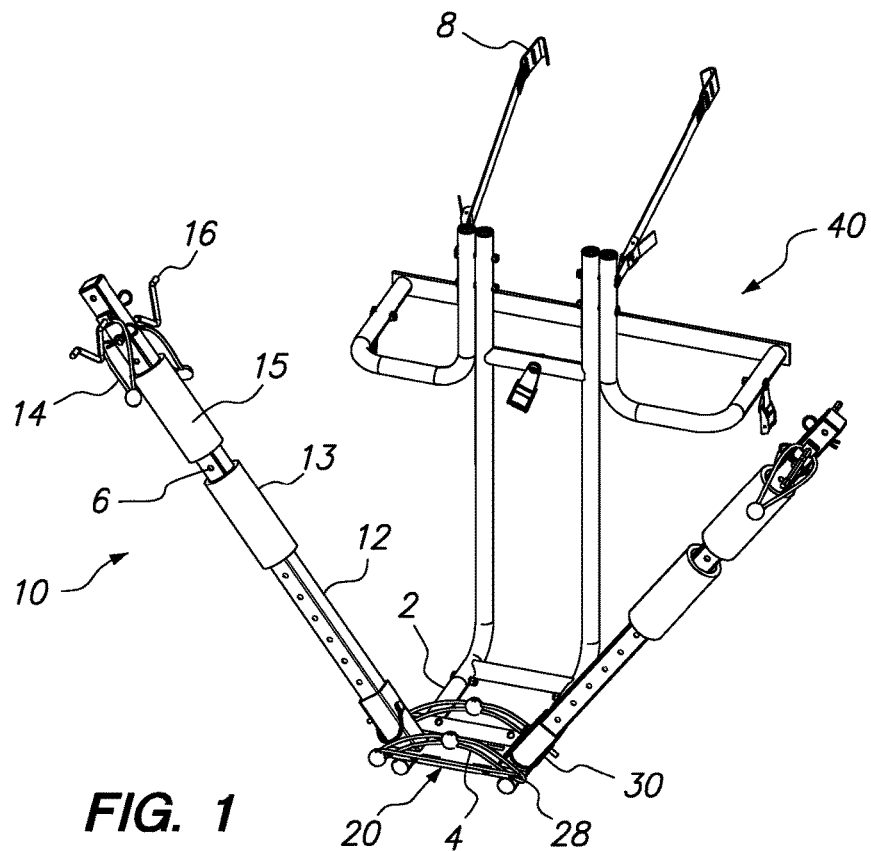
FIG. 1 is a perspective view of a cargo carrier of a preferred embodiment of the present invention.

The present invention provides a cargo carrier 10 for mounting to a vehicle and carrying a range of equipment and other cargo, which may include, without limitation, recreational equipment such as cycles, skis, snowboards, surfboards, paddle boards, construction or landscaping equipment, or cases, bags or boxes holding smaller items. It is to be expressly understood that these exemplary embodiments are provided for descriptive purposes only and are not meant to unduly limit the scope of the present inventive concept. Preferred and alternative embodiments depicted in the drawings are illustrative of the numerous features of the present cargo carrier, including, without limitation, its versatile mounting mechanisms and cargo applications. Other embodiments of the cargo carriers and methods of use of the present invention are considered within the present inventive concept as set forth in the claims herein. For explanatory purposes only, the cargo carriers of the preferred embodiments are discussed primarily for the purposes of understanding the scope of the present invention and is not intended to limit the scope to those particular embodiments. It is to be expressly understood that alternative embodiments of cargo carriers are contemplated as well.

Referring to FIG. 1, carrier 10 of this preferred embodiment includes a base plate 20, bracket 30 and angled arm members 12, and is attached to a tubular frame 40, which is configured for stable mounting in the rear of several vehicle types, as described below. Carrier 10 is attached to frame 40 by clamping fasteners through four rectangular holes 22 of base plate and securing the fasteners about lower arm members 2. As detailed in FIG. 1, arm members 12 are provided with a series of spaced holes 6 for engagement of pinnable cargo fasteners such as, for example, support collar pin 16, for stabilizing or securing cargo. The preferred embodiment of FIG. 1 illustrates such engagement with spaced holes 6 by pin locking mechanisms securing pins inserted in spaced holes 6 of arm members 12 by lock looping elastomer toggle cord 16 about an end of support collar pin 14.

Figure 1A:
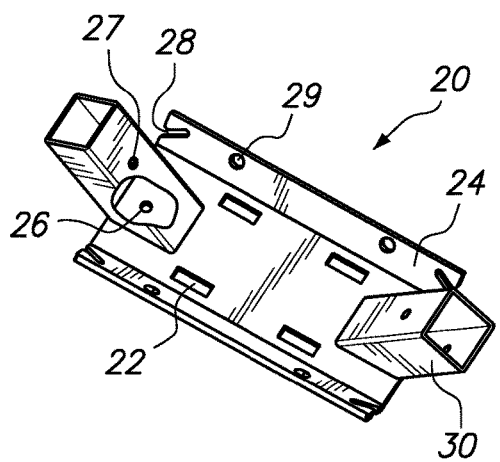
FIG. 1A is a top perspective view of a preferred embodiment of a base plate and a bracket of the present invention.
Figure 1B:
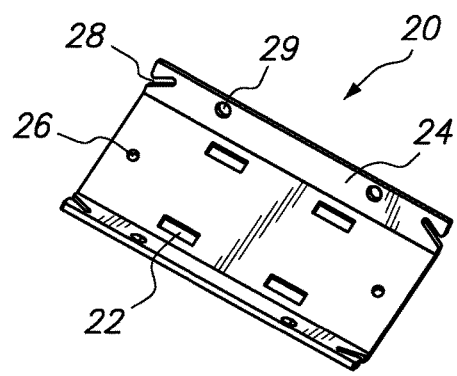
FIG. 1B is top perspective view of a preferred embodiment of a base plate of the present invention.

Base plate 20 of FIG. 1, as detailed in FIGS. 1A and 1B, provides a mounting mechanism enabling various embodiments of the present invention. Referring to the enlarged views of FIGS. 1A and 1B, opposing sides of base plate 20 extend into upwardly angled flanges 24, whereby draining of moisture is expedited and any potential warping or other weathering is averted. A further feature of base plate 20 enhancing draining is drainhole 26 enclosed within bracket 30. Additional features of base plate 20 include toggle notches 28 for anchoring bungee toggle cord 4, or some alternative cargo fastener, shown in FIG. 1 and fastener holes 29 for receiving cargo fasteners suited to the cargo being secured.

FIGS. 2-8 depict exemplary attachments of base plate 20 to arm structures for mounting carriers on rear of vehicle applications. Referring to FIG. 2, an alternative use of carrier 10 for carrying snowboard 42 which is positioned for securing on a trunk mounted frame 44 employing elastomer cord hooks 48 to secure frame 44 onto the horizontal exterior surface of a low profile sedan. In an alternative application of carrier 10, shown mounted on a sport utility vehicle, in FIG. 3, elastomer cord hook 48 is secured on the outer edge of the rear door of the vehicle. Versatility of carrier 10 is further shown in the illustration simultaneous fastening of snowboard 42 on the back side of carrier 10 facing the vehicle and bicycle 49 on the front side of carrier 10 by utilizing suitable cargo fasteners, such as elastomer toggle fastener 14.

As illustrated in FIG. 3, an upper portion of the tires of bicycle 49 are secured to carrier 10 by fastening elastomer toggle fasteners 14 to corresponding support collar pins. Elastomer toggle fasteners 14 are adapted to support and secure snowboard 42 onto carrier 10. In this particularly preferred embodiment of the present invention, as most clearly shown in the enlarged view of FIG. 3A, bungee toggle cord 4 loops around to secure a pedal of bicycle 49. In alternative embodiments, these and other fasteners may be employed to secure various types and components of cargo.

Figure 4A:
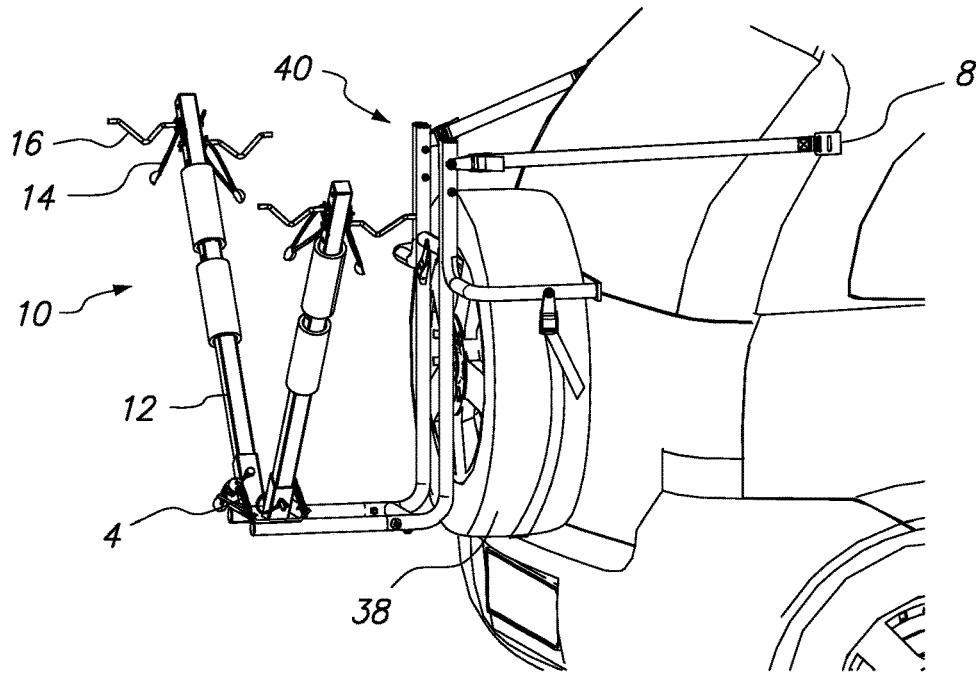
FIG. 4A is a perspective view of a preferred embodiment of the present invention mounted on an exterior spare tire.

In an application of the preferred embodiment shown in FIG. 4A, carrier 10 is attached to frame 40 adapted to mounting about a spare tire. Added stability to the latter embodiment of the invention employing arm frame 40 is provided by appropriately securing bungee hooks 8 proximal to carrier 10. For example, tubular frame mounting bar adaptable to a sedan trunk may be stabilized by seating bungee hooks 48 in taut position about a trunk edge as illustrated in FIG. 2 or hatchback side edge as illustrated in FIG. 3.

Arm members 12 are secured from movement relative to the bracket 30 by locking pins inserted through holes 27 in brackets 30. Alternative locking mechanisms may be employed to lock arm members to the bracket or each other. In alternative embodiments, such locking mechanisms may include, without limitation, cam, collets, or other clamping mechanisms.

Additional aspects of this preferred embodiment include bumpers 13, which are composed of a resilient material to cushion cargo and prevent direct contact with carrier 10. This minimizes scratching and potential damage to the cargo. Bumpers 13 are slidable on arm members 12 to facilitate positioning to cushion more fragile or contact points of cargo most prone to damage. Another feature of a preferred embodiment of the present invention are offset apertures 15 of the bumpers. Offset apertures 15 are mounted onto arm members 12 so that the bumpers 13 can be rotated to change the amount of material cushioning against of the cargo being carried. Moreover, apertures 15 are adjustable to accommodate different frame thicknesses and cargo configurations; thus, bumpers 13 may be adjusted to accommodate the different sizes and shapes.

Cargo fasteners for use with carrier 10 and alternative embodiments thereof include al range of securing mechanisms suitable for the recreational equipment, tools, case or other cargo, and may be insertable through spaced holes 6 of arm arms 12 or toggle notch 28 or holes 29 of base plate 20, or strapped or attached to carrier 10 in any manner suitably securing relevant cargo. Such fasteners and supports include, without limitation, cradles and collars for wheels or other suitably shaped structures, hooks, bungees, clamps, clips, clasps and carabiner. Adjustment of fasteners and supports along the angular orientation of the arm members facilitates accommodation to differing types, sizes and shapes of cargo.

Figure 4B:
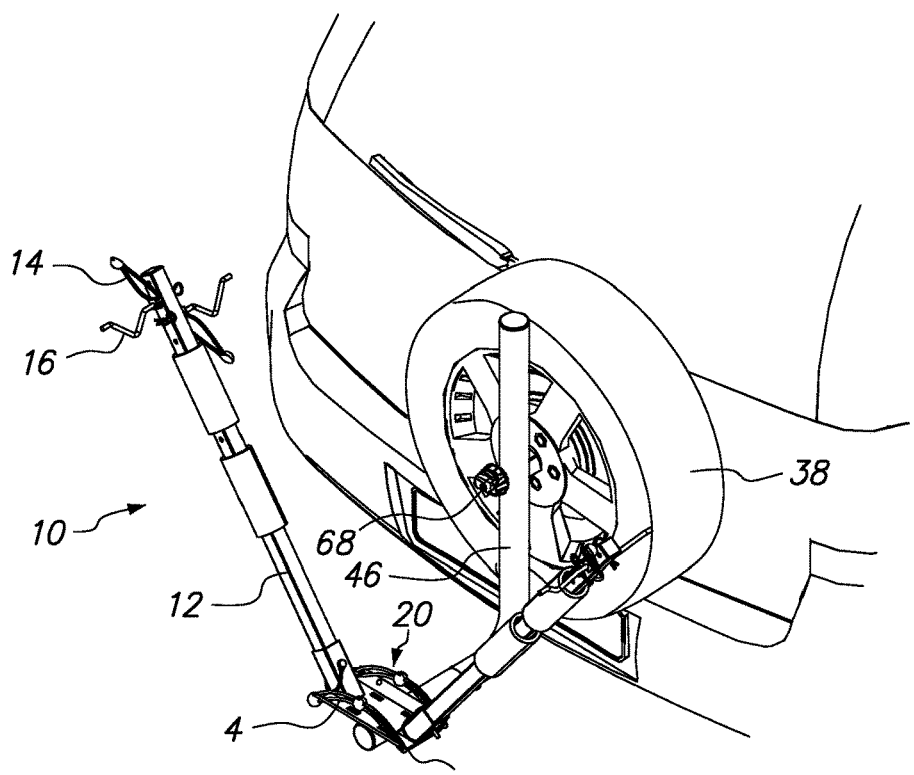
FIG. 4B is a perspective view of an alternative embodiment of the present invention mounted on an exterior spare tire.

FIGS. 4A and 4B illustrate adaptability of tubular frame 40 about a spare tire mounted on the rear exterior of a sport utility vehicle. As illustrated in the latter drawings bungee hooks 8 are seated upon the side edge of the rear door to stabilize and secure carrier 10. In an alternative embodiment for fastening carrier 10 around a spare tire mounted on the rear exterior of a sport utility vehicle illustrated in FIG. 4B, base plate 20 is mounted on elongated L tube 46 having a hole corresponding to spare tire bolt 68 which is inserted and tightened to fasten elongated L tube 46 onto the outer sidewall of spare tire 38.

Figure 5:
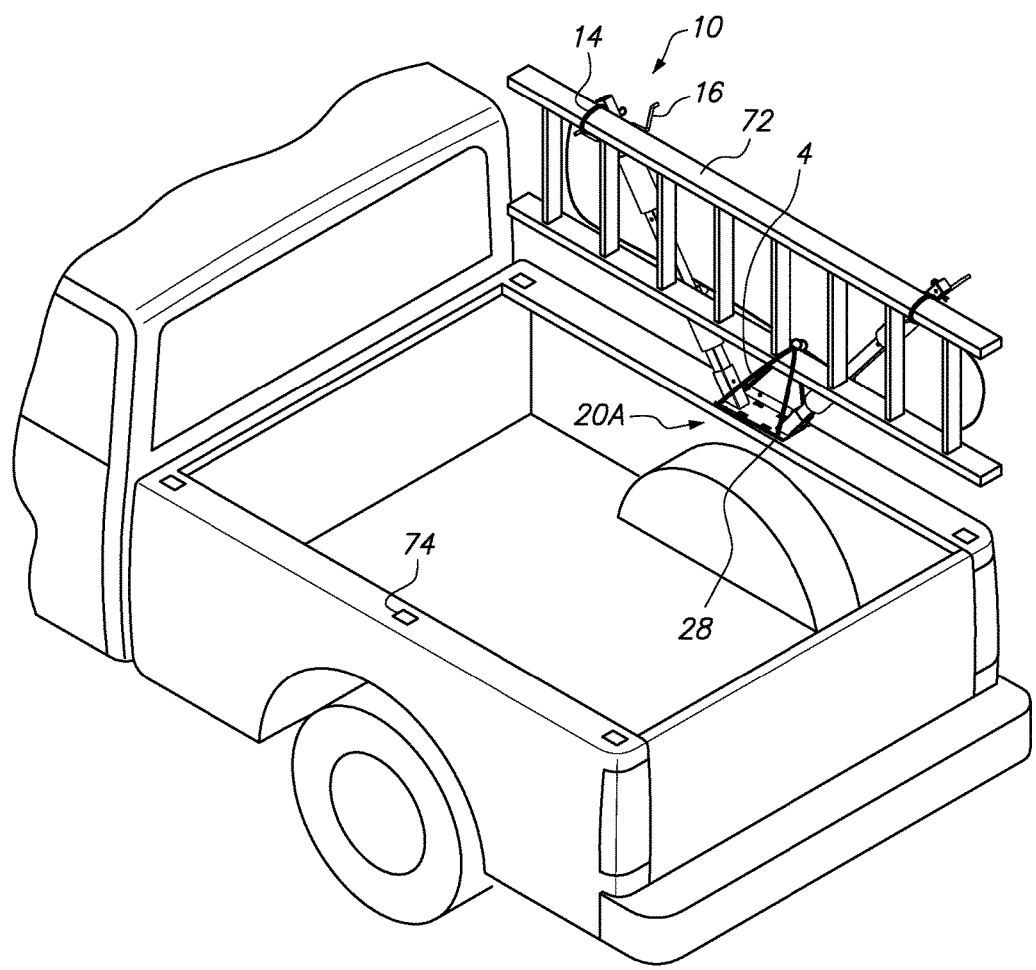
FIG. 5 is a perspective view of a preferred embodiment of the present invention mounted on a sidewall of a truck bed, in use.

Now referring to FIG. 5, an alternative embodiment showing application of carrier 10 to carry a ladder 72 along the sidewall of a pickup truck is shown. In the application shown, base plate 20A is secured to the utility mount hole 74 on the sidewall of the pickup truck. Carrier 10 is adapted to this use by nesting the upper rail of ladder 72 on support collar pins 16 while elastomer toggle fasteners 14 are attached to opposing ends of support collar pins 16. Bungee toggle cord 4 is looped around the lower rail of ladder 72 and secured by engaging the toggle under toggle pocket 28 It can be readily seen that this configuration leaves the bed of the pickup truck open for hauling other cargo, including, for example tools, materials and supplies and even debris or yard waste. In addition, the V rack provided by carrier 10 may be used as a frame for retaining and securing loads that extend above the sidewalls of the pickup truck.

Figure 6:
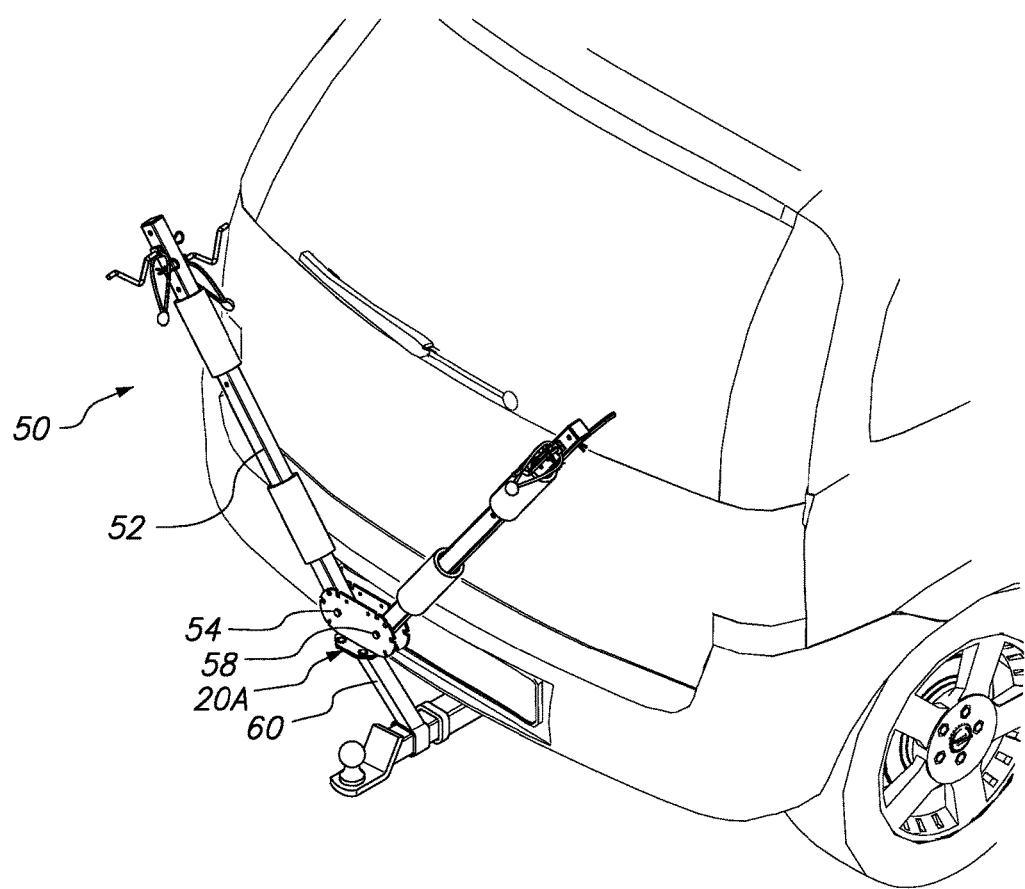
FIG. 6 is a perspective view of a preferred embodiment of the present invention mounted on a tow tower of a hitch receiver.
Figure 6A:
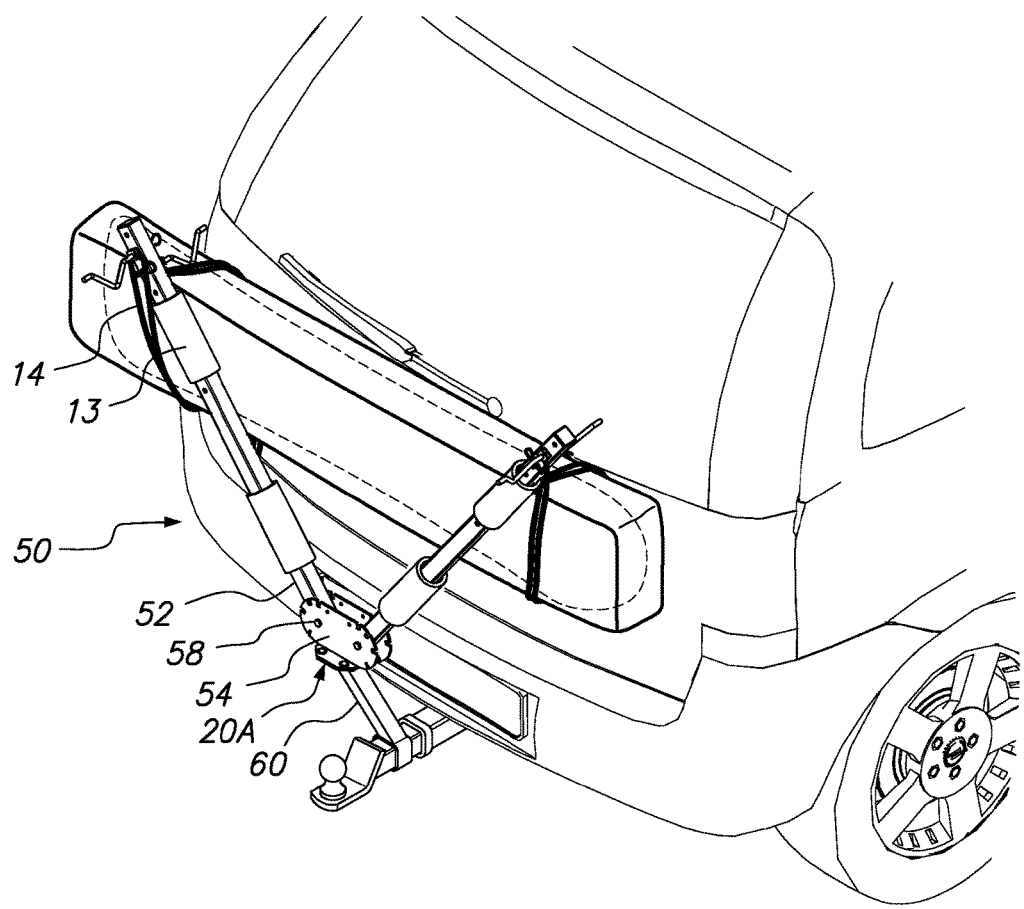
FIG. 6A is a perspective view of a preferred embodiment of the present invention mounted on a tow tower of a hitch receiver, in use.
Figure 6B:
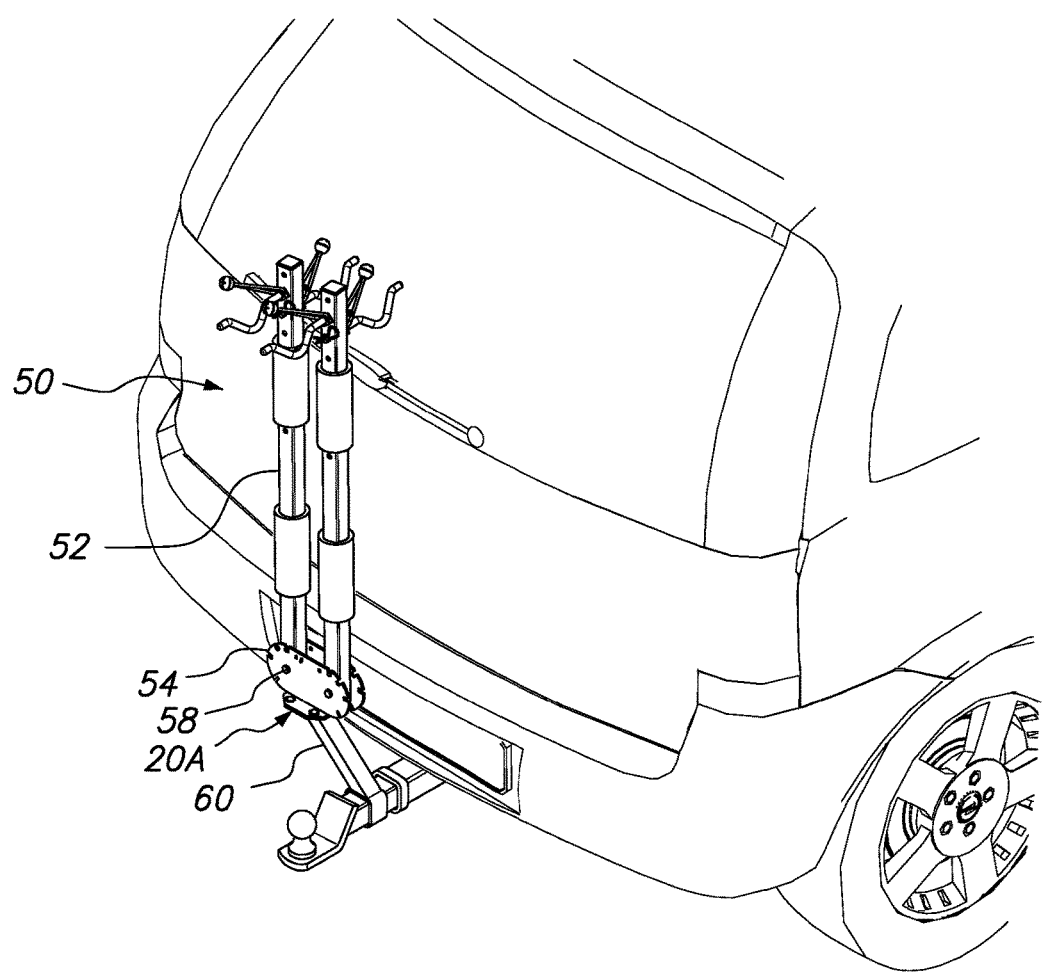
FIG. 6B is a perspective view of a preferred embodiment of the present invention mounted on a tow tower of a hitch receiver, in an upright, closed position.
Figure 6C:
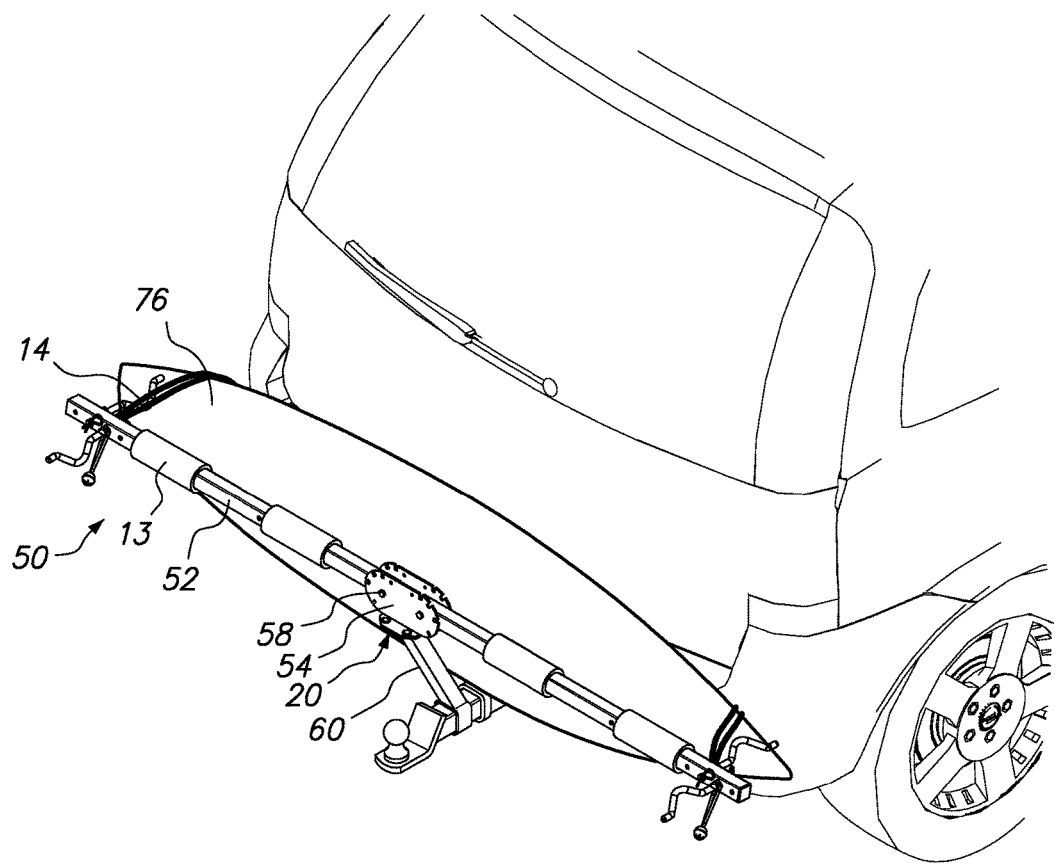
FIG. 6C is a perspective view of a preferred embodiment of the present invention mounted on a tow tower of a hitch receiver, in and open horizontal position.

FIGS. 6-6C depict a preferred embodiment of the present invention comprising articulating carrier 50 with arm members 52 extending outwardly from articulating hub 54, and base plate 20A which is attached to articulating hub 54, preferably by bolts, but can also be fastened with a clamp or other attachment mechanism, or welded. This embodiment is adapted to bracketed shank 60 adapted for mated engagement with a hitch receiver as shown in FIGS. 6-6C. Articulating carrier 50 features articulating hub 54 comprising of two outer, generally oval, plates fastened in parallel alignment by two swivel bolts 58 which rotatably connect a lower edge of two arm members 52 with the outer oval plates such that arm members 52 adjustably articulate continuously through angles ranging from zero to 180 degrees. In a particularly preferred embodiment, articulating carrier 50 further employs ratcheted stops whereby arm members are affixed in positions, preferably spaced at successive 10 degree angles.

FIG. 6A further illustrates adaptation of the present invention to a cargo bag by looping elastomer toggle fastener 14 about a cargo bag containing snowboard, which may be simultaneously nested on a support collar pin engageably inserted into arm member 52 and thereby secured to articulating carrier 50. Positioning of bumper 13 between arm member 52 and the cargo cushions movement and consequent rattling of the cargo relative to articulating carrier 50.

FIGS. 6B-6C illustrate the adjustment range of articulating carrier 50. As shown by the latter drawings, arm members 52 deploy swivel bolts 58 to continuously articulate from a position perpendicular or 90 degrees from the longitudinal axis of articulating hub 54. FIG. 6C depicts two arm members 52 articulated to a fully open angle of 180 degrees along a longitudinal axis of articulating hub 54 shown in use adapted to surfboard 76 which is fastened to articulating carrier 50 with elastomer toggle fasteners 14. Bumpers 13 are spaced equidistantly to cushion and protect surfboard 76 from damage potentially resulting from impacts of rugged road conditions or an accident.

Figure 7:
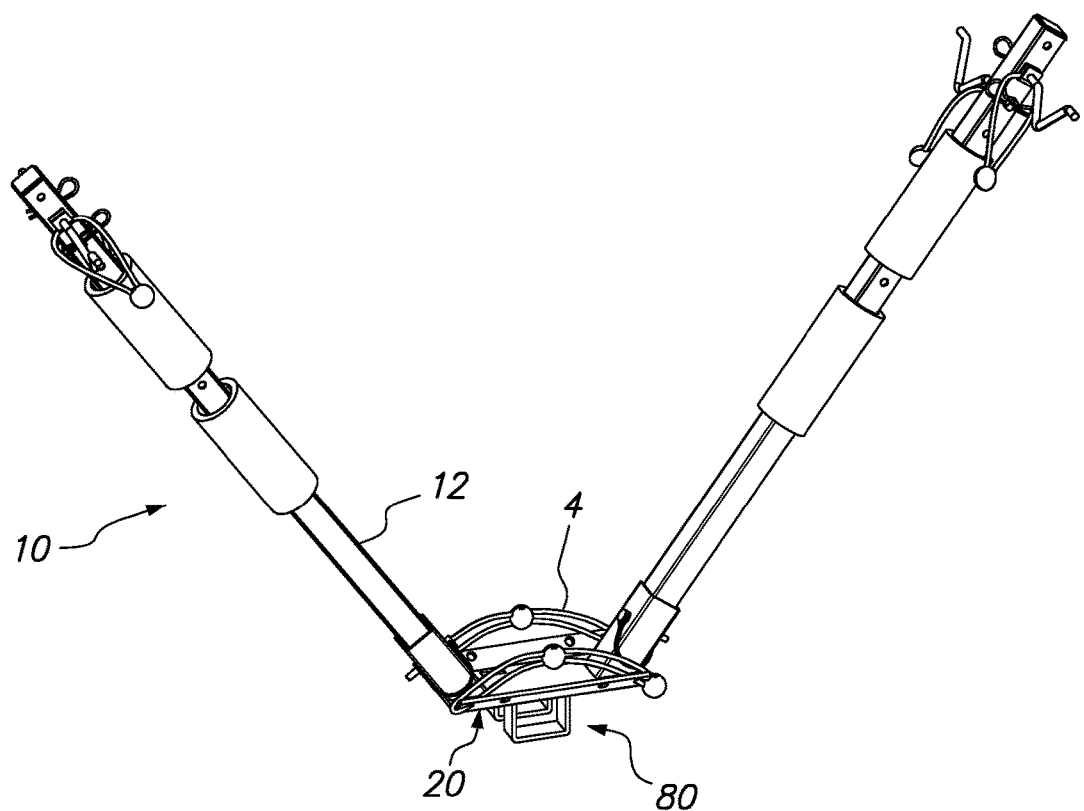
FIG. 7 is a perspective view of a preferred embodiment of the present invention with a hat bracket, assembled.
Figure 7A:
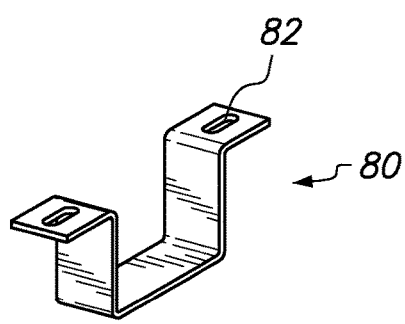
FIG. 7A is an enlarged view of a preferred embodiment of the present invention employing a hat bracket.

Now referring to FIG. 7 depicting particularly preferred embodiments of the present invention employing two hat brackets 80 bolted on a bottom surface of a base plate 20 to assure durably secure and stable fastening of a carrier to a corresponding rail, the dual bracketing securely fastens carrier 10 to arm members 12 and down to base plate 20 thereby enabling portable attachment to corresponding rails, frequently but not exclusively used, on rooftops of vehicles. An enlarged view of hat bracket 80 is shown in FIG. 7A. The interior dimension of hat bracket 80 corresponds with a bar or rail to which it is attached, and preferably measures 1×1 inch, or 2.54×2.54 cm. In alternative embodiments, hat bracket 80 is configured for compressible attachment to a corresponding bar such as described below. Multiple bracket mounting, as well as, use of high tensile strength materials, preferably metals or metal alloys such as, for example, aluminum, are employed in particularly preferred embodiments of the present invention in order to impart a strong and durable mechanism which can withstand rugged road or weather conditions, or a high impacts resulting from accidents or being hit by a heavy object, in order to stably support even voluminous and dense loads. In alternative embodiments, hat bracket 80 may be secured to any mounting mechanism or directly to a carrier of a vehicle surface.

FIG. 8 depicts a preferred embodiment of the present invention wherein articulating carrier 50 employs base plate 20A attached to articulating hub 54, which is in turn fastened to hat bracket 80. As with the embodiment shown in FIG. 7, two hat brackets 80 are employed to durably support the articulating motion of arm members 52 deployed by pivot pins 58 and potentially sizeable loads secured thereto.

Figure 9:
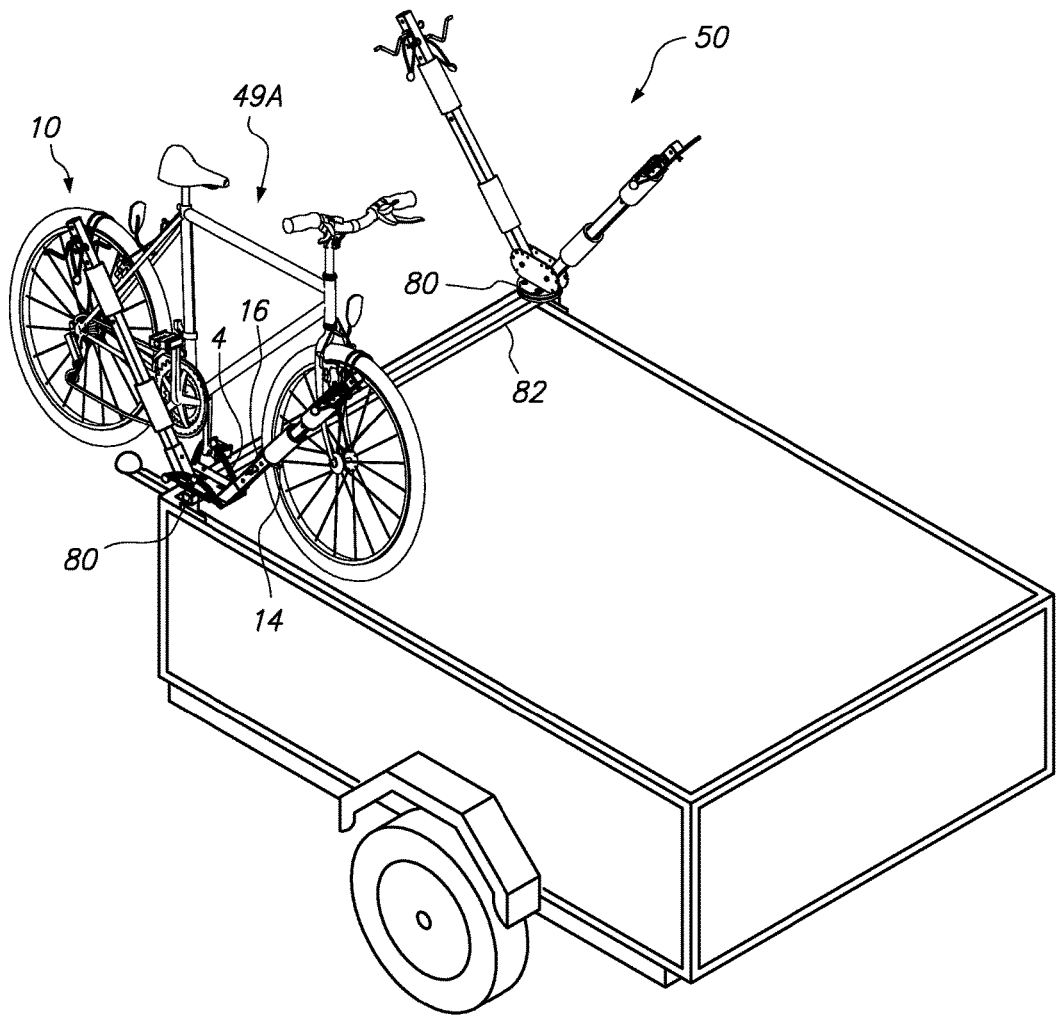
FIG. 9 is a perspective view of preferred embodiments of the present invention mounted on a wall and across the bed of a trailer.

FIGS. 8A and 8B illustrate alternatives of embodiments employing a lower retainer for a cycle wheel. In FIG. 8A, bracket 78 engageable with a lower portion of a cycle wheel is shown. FIG. 8B depicts a lower wheel retainer frictionally engageable by looping elastomer toggle cord 4 over a lower portion of the adjacent bicycle wheel and engaging then securing it about collar support pin 16, which is inserted into corresponding hole 6A located proximal to the articulating end of arm member 52, as shown in FIG. 9. This prevents the wheels from articulating relative to the bicycle carrier during transport. FIG. 9 depicts a full perspective view showing how lower pedal of bicycle 49A is secured by looping bungee toggle cord 4 about the pedal while the toggles thereof are engaged with toggle notches 28.

FIG. 9 further illustrates attachment of hat bracket 80 to corresponding mounting bar 82 installed on a trailer. As shown, dual hat brackets 80 can be used to attach both carrier 10 and articulating carrier 50 securely onto mounting bar 82. As depicted in FIG. 9, bolting dual hat brackets 80 into mated engagement with mounting bar 82 securely locks carrier 10 and articulating carrier 50 thereon. Although not shown, it is readily deciphered that bolts corresponding to holes 82 are attached to base plate 20 to provide portable attachment to corresponding bars Embodiments of the present invention bolting hat bracket 80 onto various alternative mounting bars enable portable mounting of this cargo carrier onto various suitable surfaces, tubes or bars on the same or multiple vehicles. Hence, detachable engagement of hat bracket 80 with a corresponding bar on a vehicle imparts portability between vehicles and surfaces.

Figure 10:
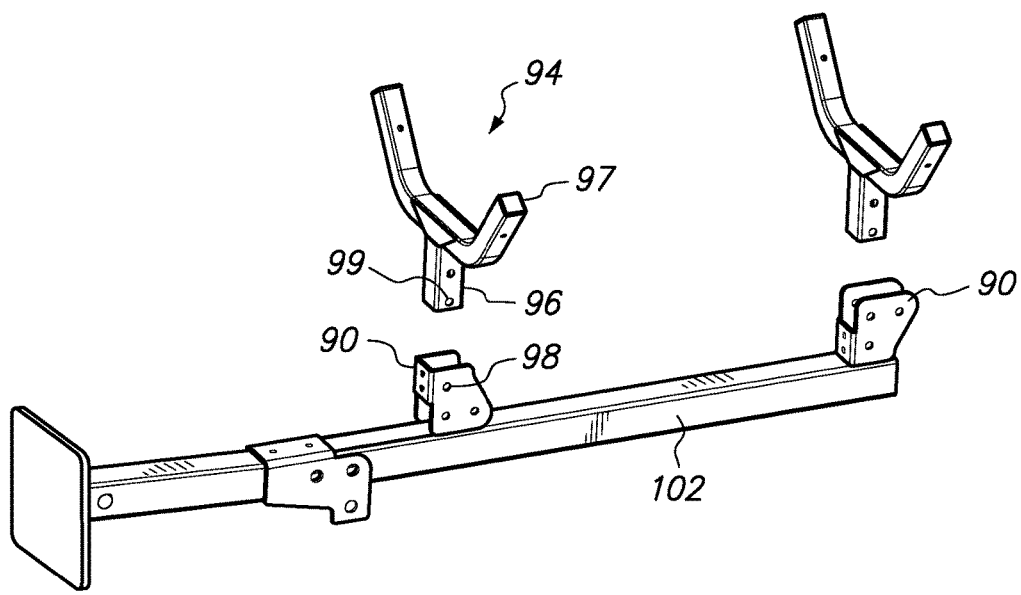
FIG. 10 is a perspective view of another preferred embodiment depicting a tilt bracket on a bar.
Figure 10A:
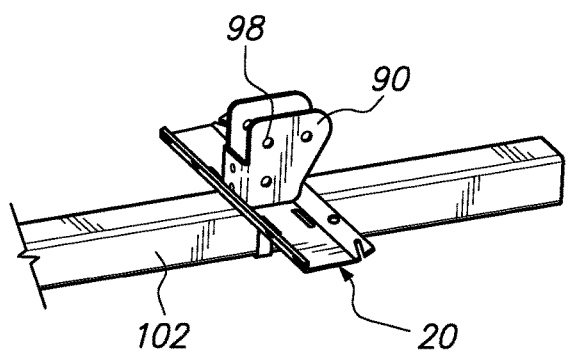
FIG. 10A is a perspective view of another preferred embodiment employing a base plate with a hat bracket to attach a tilt base to a corresponding bar.

Now referring to FIGS. 10-10A, alternative embodiments of the present invention employ tilt bracket 90 which are detachably engaged by corresponding pivot pins (not shown) insertable into pivot holes 98 aligned on opposing transverse sides of tilt bracket 90 and corresponding holes 99 through Y mount 94, comprising stem tube 96 clamped to U tube 98, which is pivotally connected to tilt bracket 90.

Embodiments employing tilt bracket 90 enable facile fastening of cargo to the cargo carrier by providing a mechanism for pivoting a carrier mounted thereon into a proximal position facilitating the fastening and unfastening of a bicycle or other cargo thereon. Pivoted tilting back and forth enabled by the tilt bracket as shown in FIGS. 10-11A mounting mechanism further enables orienting the cargo to maximize aerodynamic flow and thereby conserve fuel consumption of the vehicle.

Figure 11:
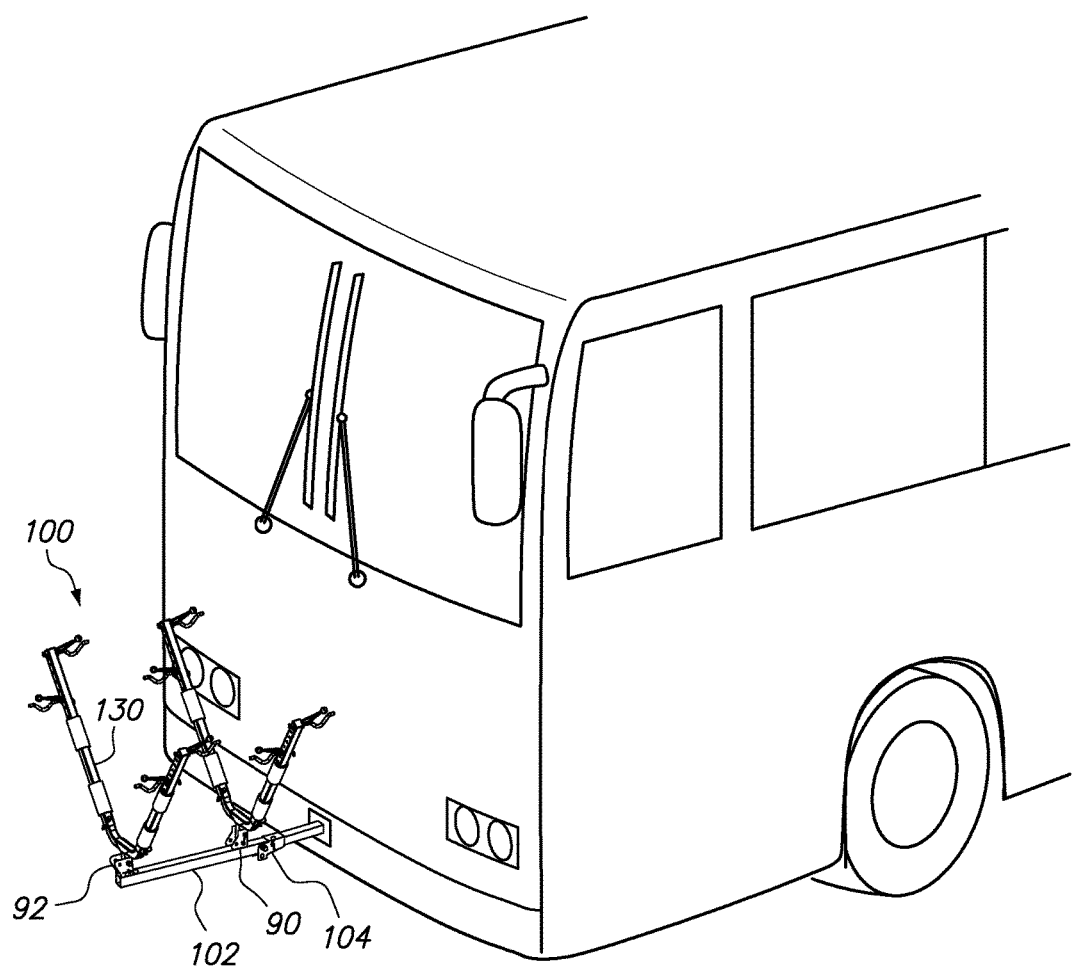
FIG. 11 is a perspective view a preferred embodiment employing a tilt bracket on the front of a bus
Figure 11A:
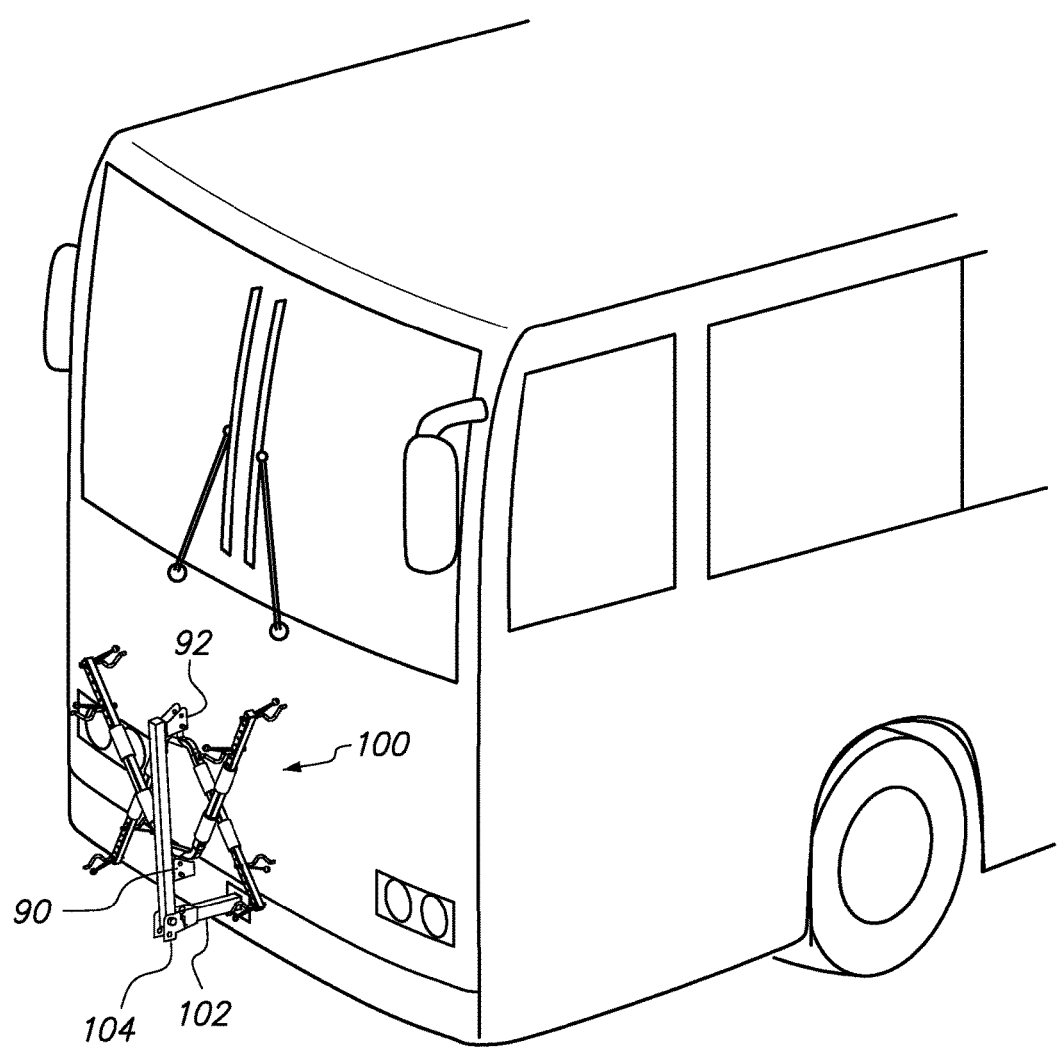
FIG. 11A is a perspective view of a preferred embodiment employing a tilt bracket on the front of a bus in another position.
Figure 12:
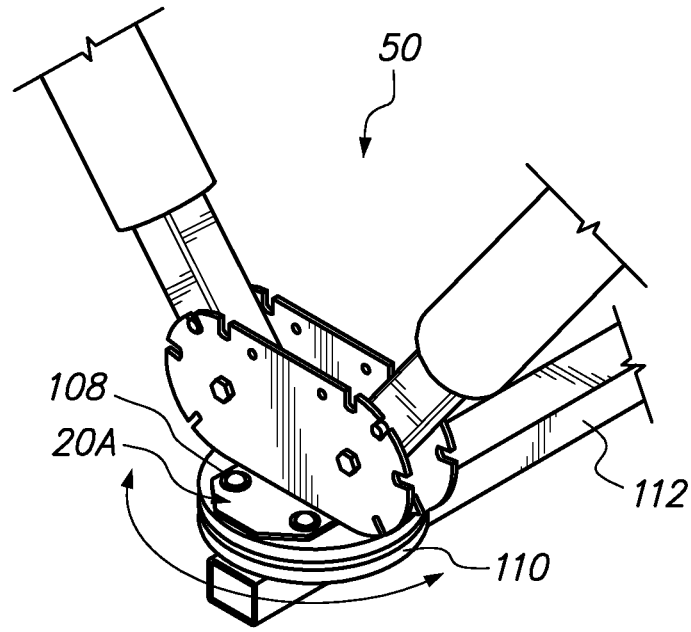
FIG. 12 is a perspective view of a preferred embodiment employing a swivel base according to the present invention.
Figure 13:
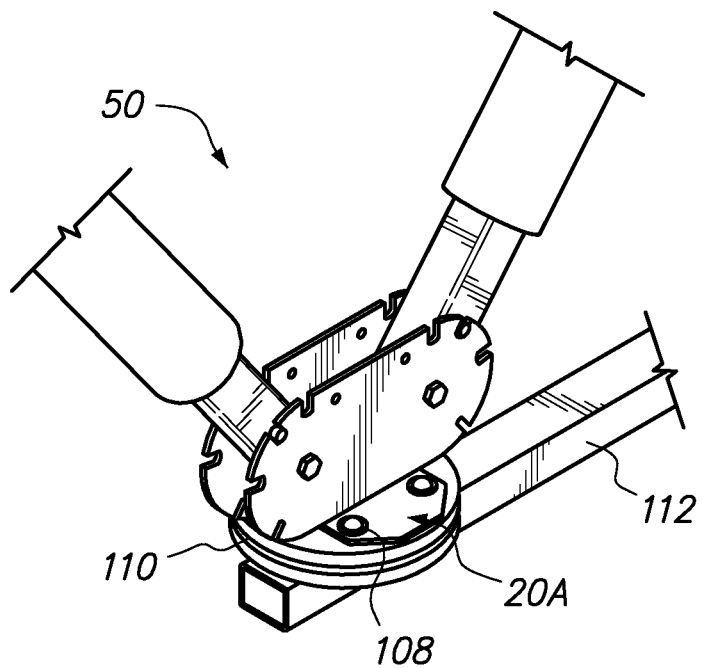
FIG. 13 is a perspective view of a preferred embodiment employing a swivel base according to the present invention.

FIGS. 11-11A illustrate exemplary uses of tilt bracket 90 on tilt bar carrier 100 shown on the front of a bus. As shown, tilt bar carrier 100 employs tilt brackets 90 on bar 102. In addition, tilt bracket 104 is provided to position bar 102 parallel to the front of bus when the bicycle carriers 100 are not in use.

Figure 14:
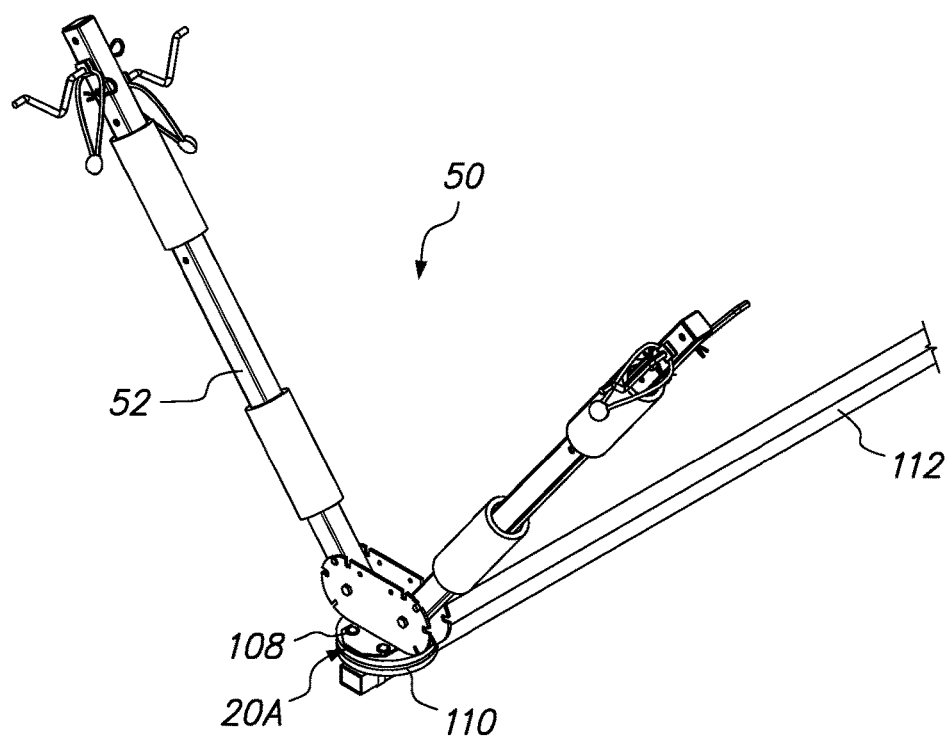
FIG. 14 is a perspective view of a preferred embodiment employing a swivel base according to the present invention in a transport position.
Figure 15:
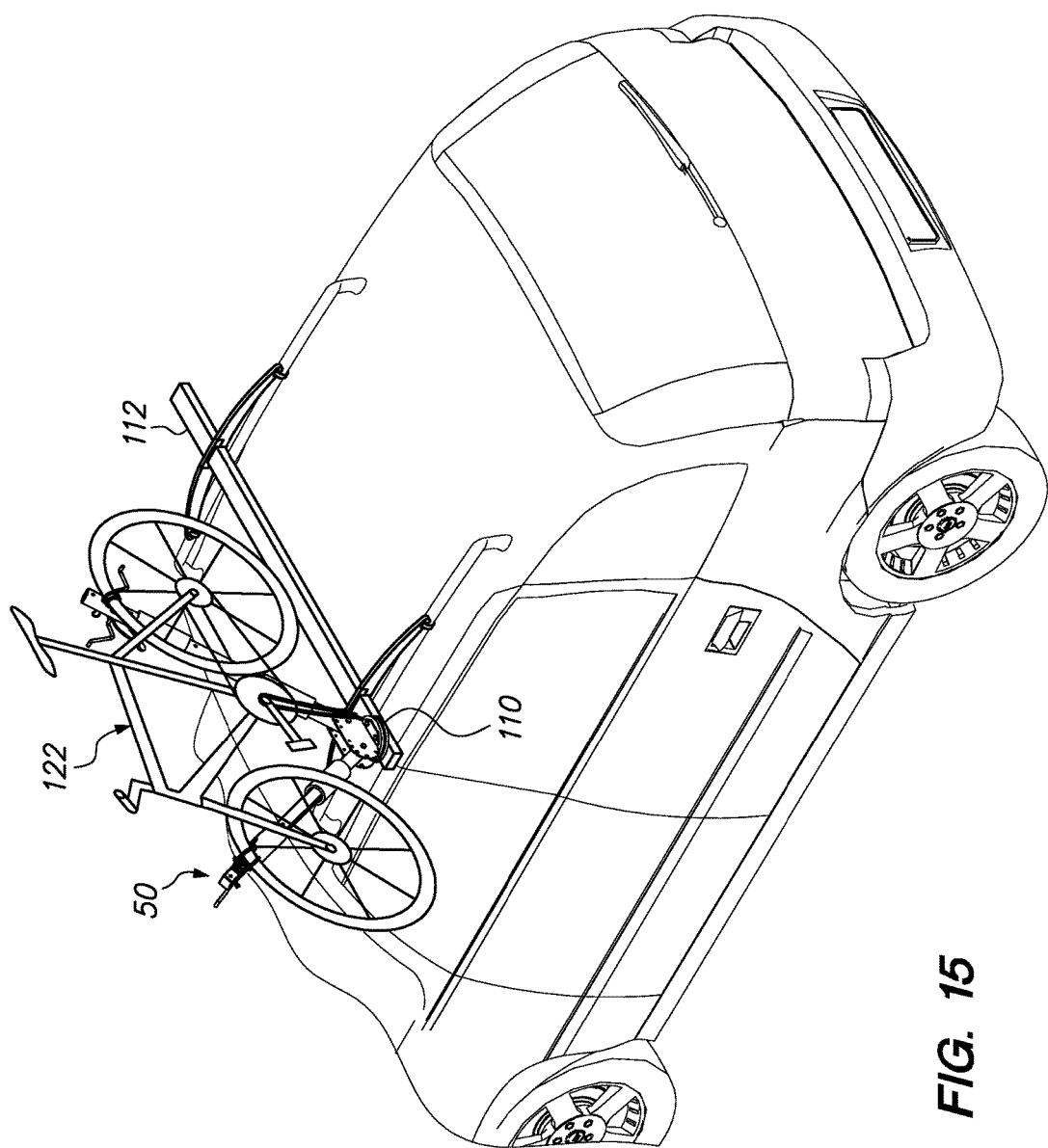
FIG. 15 is a perspective view of a preferred embodiment employing a swivel base according to the present invention in a loading position, in use.
Figure 16:
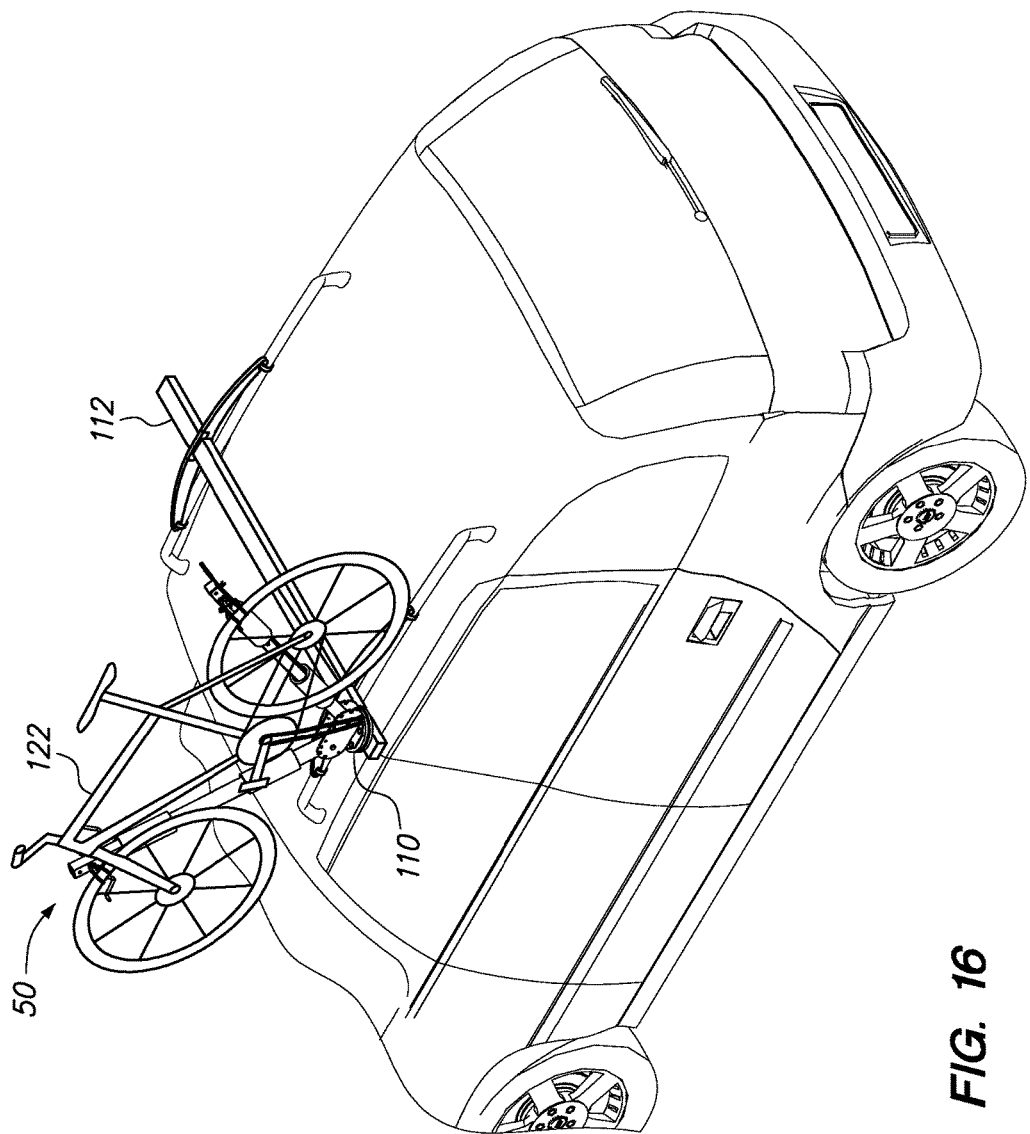
FIG. 16 is a perspective view of a preferred embodiment employing a swivel base according to the present invention in a transport position, in use.
Figure 17:
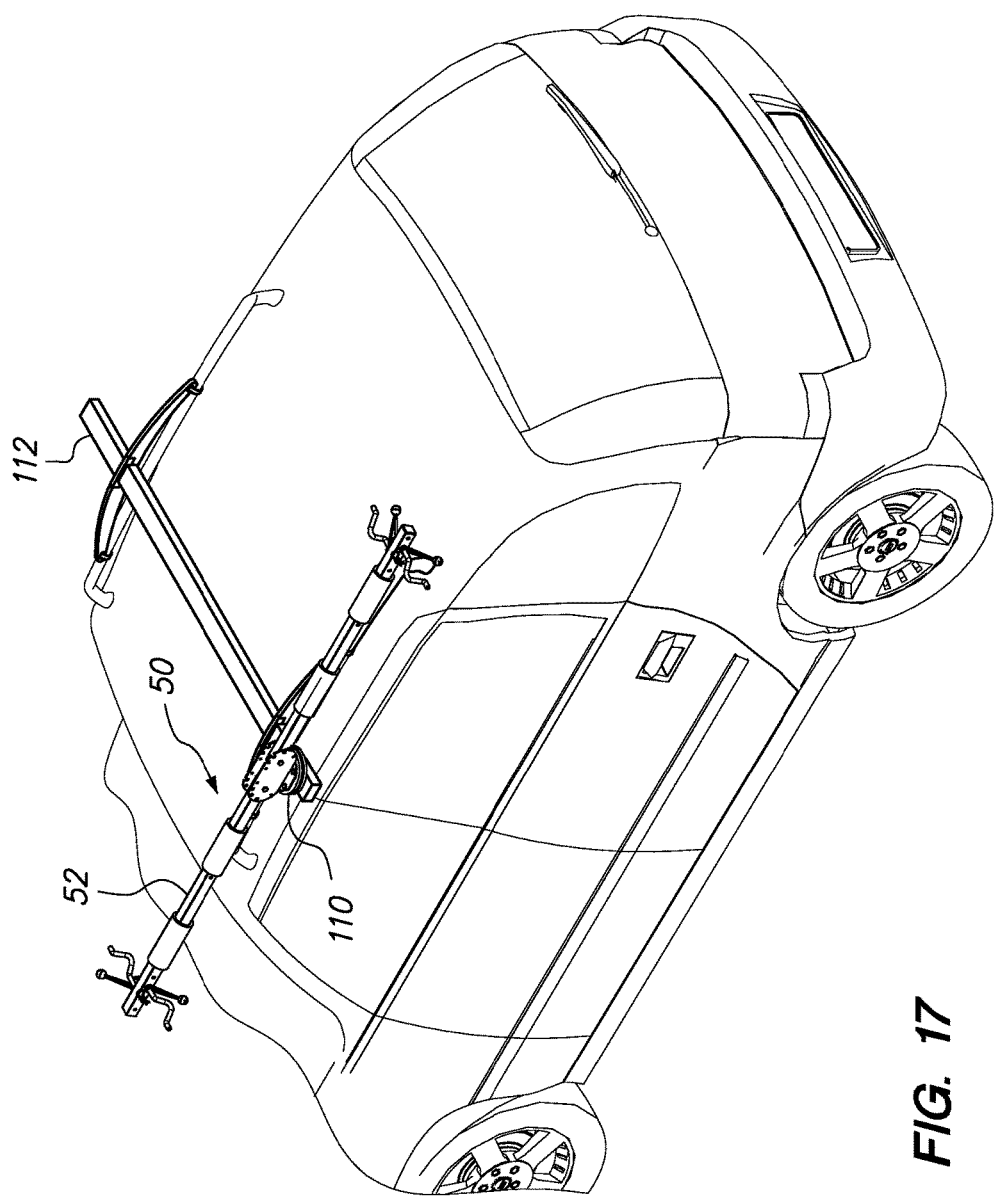
FIG. 17 is a perspective view of a preferred embodiment of FIGS. 14-16 in an open, horizontal position.

FIGS. 12-18 illustrate particularly preferred embodiments of the present invention employing a rotational swivel base 110 enabling orientation of articulating carrier 50 attached with bolts 108 to base plate 20A, which is fastened by dual hat brackets (not shown) to bar 112 and any cargo attached thereto in any direction along the rotational axis. FIG. 14 illustrates swivel base 110 mounted on bar 112 which is seatably engaged within hat bracket 80 when bolts 108 are tightened through corresponding holes in base plate 20A. Now referring to FIG. 15, swivel base 110 is oriented on the outer edge of bar 112 in an aligned direction to facilitate loading of a bicycle 122 as shown in FIG. 15. Thus positioning of carrier 50 diminishes the risk and incidence of dropping bicycle 122, and resulting potential damage to the vehicle, cargo and injury to proximal persons. FIG. 16 illustrates how swivel base 110 is rotated to position bicycle 122 in a transport position which maximizes aerodynamic and resulting fuel efficiency. Referring to FIG. 17, carrier 50 is shown in a fully open position wherein arm members 52 are horizontally positioned in generally linear alignment to form an angle of 180 degrees along a longitudinal axis perpendicular to bar 112.

Figure 18:
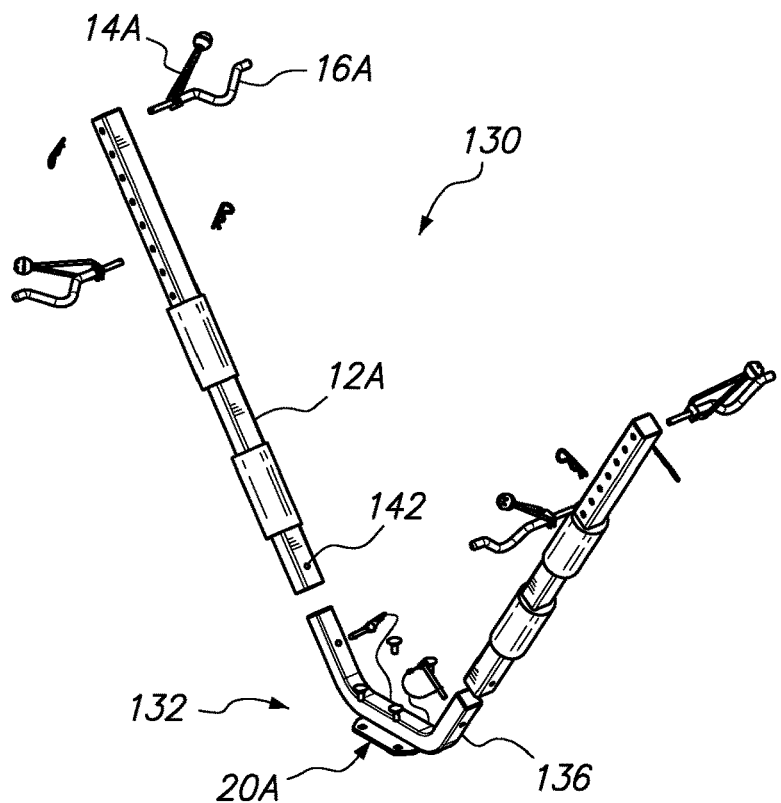
FIG. 18 is a perspective view of an alternative embodiment of the present invention.
Figure 18A:
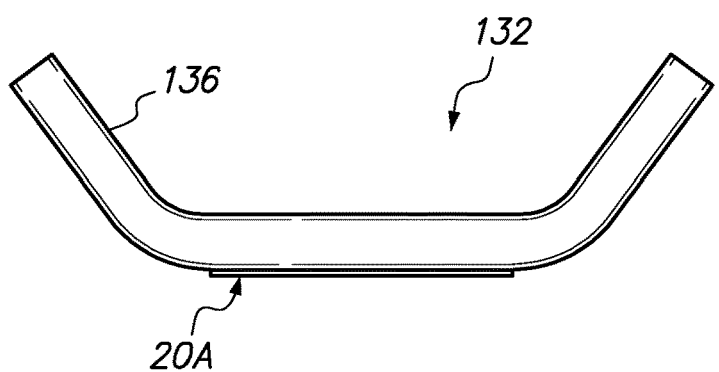
FIG. 18A is an enlarged view of an alternative embodiment of the present invention.

FIGS. 18 and 18A illustrate V carrier 130 including arm members 12A which are inserted into V bracket 132 and secured by inserting pinnable support collar 16A into holes 142. Arm members 12A are bolted in through pins inserted into holes 136 and thereby attached to V bracket 132. When assembled, arm members 12A extend upwardly at an angle to the central portion of V bracket 132. Like arm members 12 shown in FIG. 1, arm members 12A include a series of spaced holes for receiving pinnable support cradles 16A attached to elastomer toggle cords 14A or alternative cargo fasteners are attachable. A yet further portable component imparting versatility to the application of the present invention, arm members 12A are interchangeable with arm members 12 and thus are portable between V bracket 132/V Carrier 130 and carrier 10/bracket 30 shown in FIG. 1. Base mount 20A has holes for bolting V Carrier 130 to a vehicle surface, bar, or other structure when tightened through corresponding holes.

Figure 19:
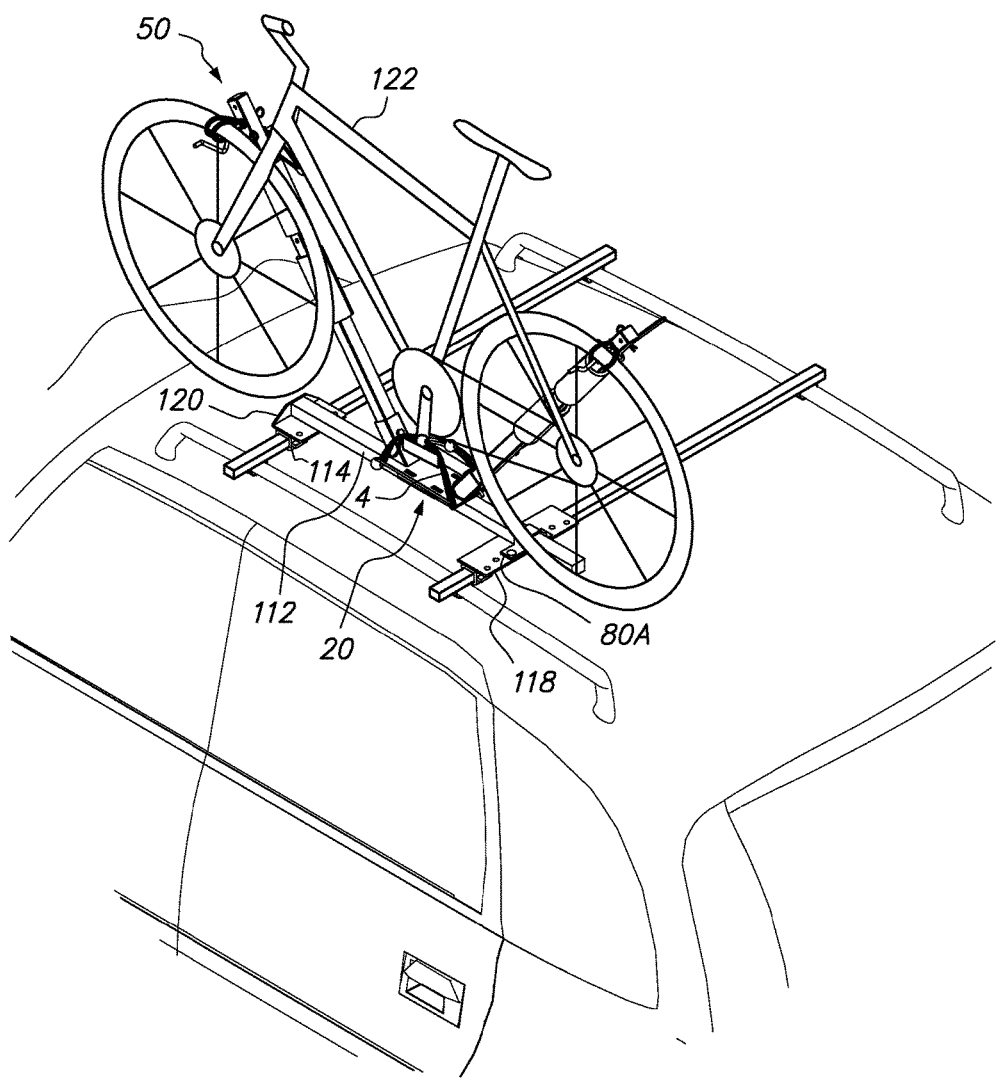
FIG. 19 is a perspective view of an alternative embodiment of the present invention mounted on a mounting bar.

Now referring to FIG. 19, carrier 10 is mounted on mounting bar 112 onto which hat bracket 80 is seated when bolted onto bar mounting base 114. This preferred embodiment particularly illustrates securing of bicycle 122 onto carrier by proper looped securing of bungee toggle cord 4 onto a lower pedal. Proper single fastener securing of bicycle 122 to carrier 10 entails engaging toggles in corresponding toggle pockets 28 while bungee toggle cord 4 is tautly secured about the pedal of bicycle 122 as shown. By positioning the bungee cord so bicycle 122 is wedged against arm members 12 cushioned by bumpers 13, the single fastener secures bicycle 122 without the need for additional supports or fasteners. In a particularly preferred embodiments, after the bicycle is mounted onto carrier 10 and pedal secure, a lower wheel retainer is employed whereby an elastomer toggle cord 14 is looped about collar support pin 16 cupped under a lower portion of the wheel. This prevents the wheels from articulating relative to the bicycle carrier during transport.

Figure 20:
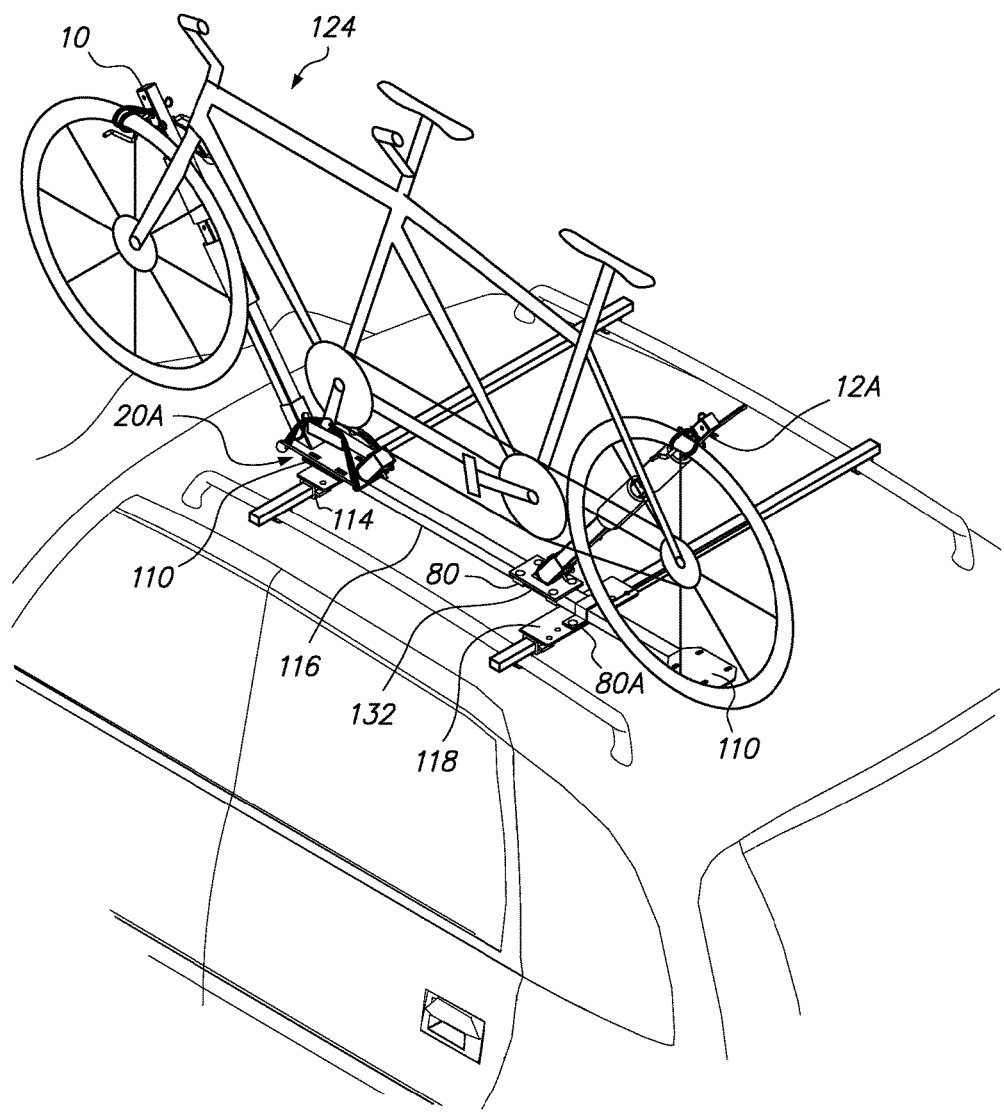
FIG. 20 is a perspective view of an alternative embodiment of the present invention in use to secure an extended frame of a tandem bicycle.

FIG. 20 illustrates a combination for securing and transporting an extended frame, such as tandem bicycle 124. In the latter configuration, the posterior wheel of bicycle 124 is fastened onto carrier 10 mounted on elongate mounting bar 116 by bolting hat bracket 80A onto rail mounting plate 114. As shown, the anterior wheel of bicycle 124 is fastened onto the forward arm member 12 of carrier 10, the anterior pedal is mounted onto base plate 20 employing the bungee toggle cord loop attachment system described in the immediately preceding paragraph. The posterior wheel is fastened to a rear mounted arm member 12A mounted on elongate mounting bar 114 which is fastened onto mounting bar 116 onto which hat bracket 80 is bolted around.

Figure 21:
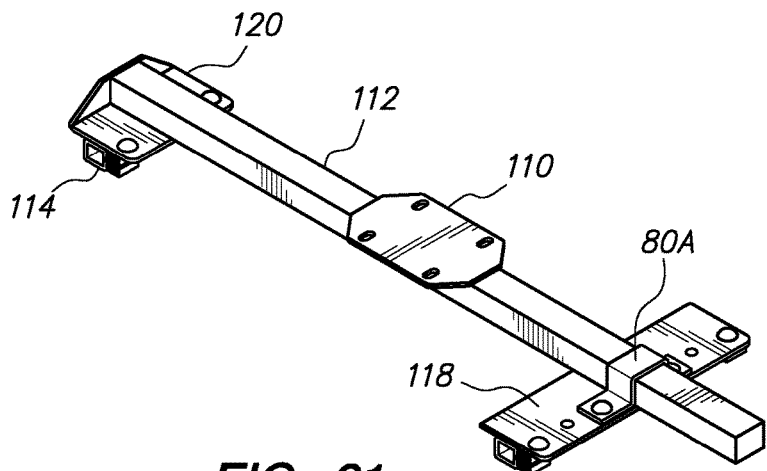
FIG. 21 is a perspective view of a mounting bar according to the present invention.
Figure 22:
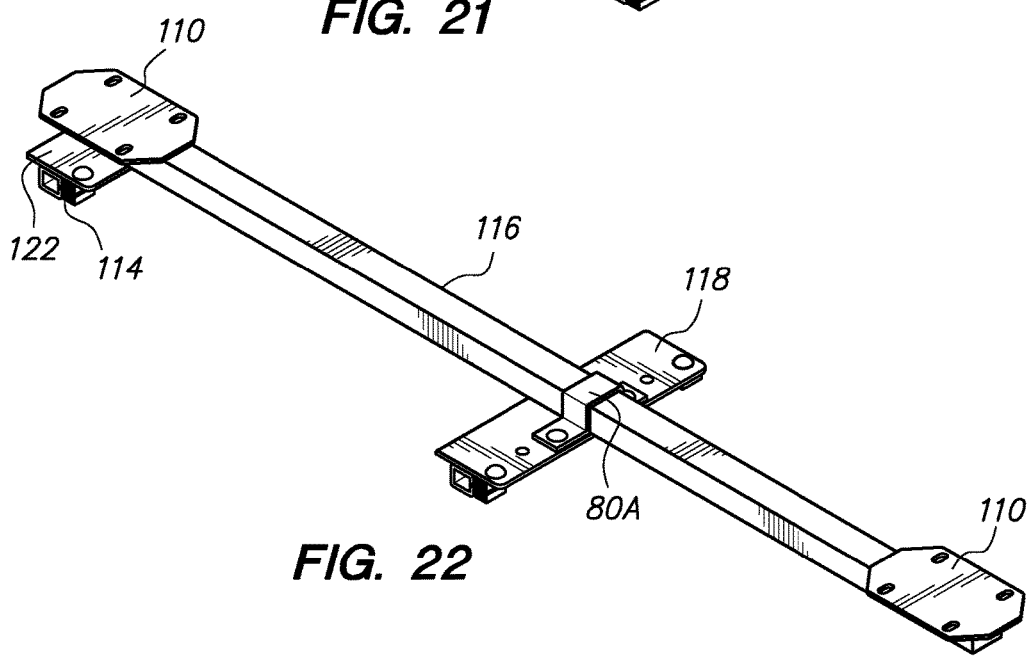
FIG. 22 is a perspective view of an elongate mounting bar according to the present invention.

FIGS. 21-22 depict use of mounting bars 112 and 116, respectively, and their mounting supports. In preferred embodiments mounting bar 112 measures 2×1×36 inches, or 5.1×5.1×91.5 cm, long, and elongate mounting bar 116 measures 2×1×60 inches, or 5.1×5.1×152.4 cm, long. Mounting bar 112 and elongated mounting bar 116 may be attached with hat brackets to bars attached or, alternatively, directly to a vehicle surface. As shown in FIG. 21, mounting bar 112 has three attachments for facilitating transport of a bicycle, or less voluminous and dense cargo loads, including: (1) corner bracket 120 to which slidable sleeve 114 which is slidably engageable with mounting bar 112, and mounting bar 116; (2) Base plate 110 attached to bar 112 by hat bracket 80, and (3) mounting plate 118, the top surface to which mounting bar 112 is bracketed onto with hat bracket 80A. Now referring to FIG. 22, elongate mounting bar 116 is sized to transport two bicycles or an elongate framed tandem bicycle such as shown, as well as, other comparably dimensioned cargo loads, utilizing two base plates 110 clamped on opposing ends of mounting bar 116 and mounting plate 118, as well as arm member bracket 132 attached between base plates.

Figure 23:
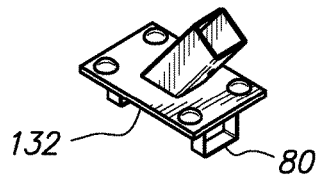
FIG. 23 is a perspective view of a mounting bracket according to the present invention.

Mounting bars 112 and 116 employ slidable sleeves 114, which FIGS. 21 and 22 show bolted on corner bracket 120, base plates 110 and mounting plate 110, to enable adjustability to the fixed spacing between existing car rails or surfaces. Rail brackets 98 thus enable adjustable, FIG. 23 depicts mounting bracket 132 configured for insertion and mated engagement of arm member 12 thereto. Bracket 132 is attachable by bolted mounting of hat bracket 80 about mounting bar 112 or 114 and onto the bottom surface of bracket 132, which FIG. 20 shows in use.

Figure 24:
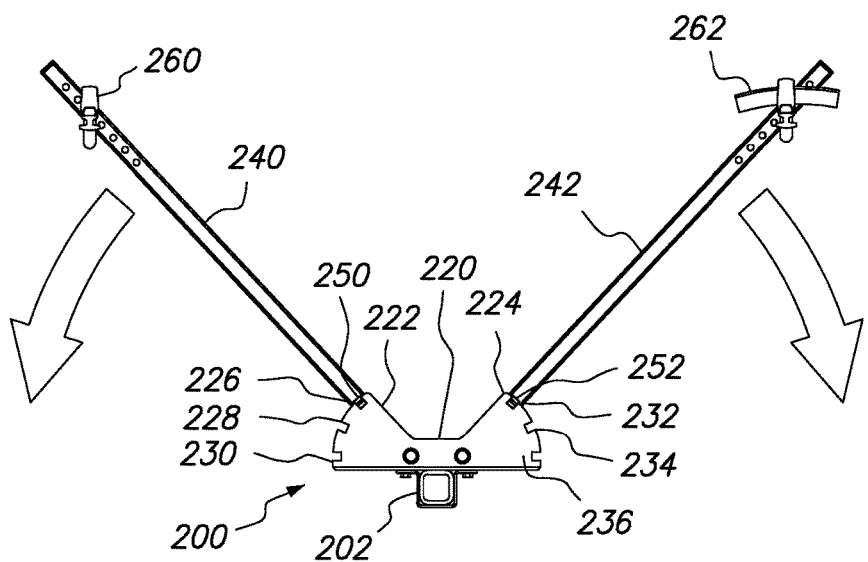
FIG. 24 is a front perspective view of an embodiment of the present invention of a hitch mounted carrier.
Figure 25:
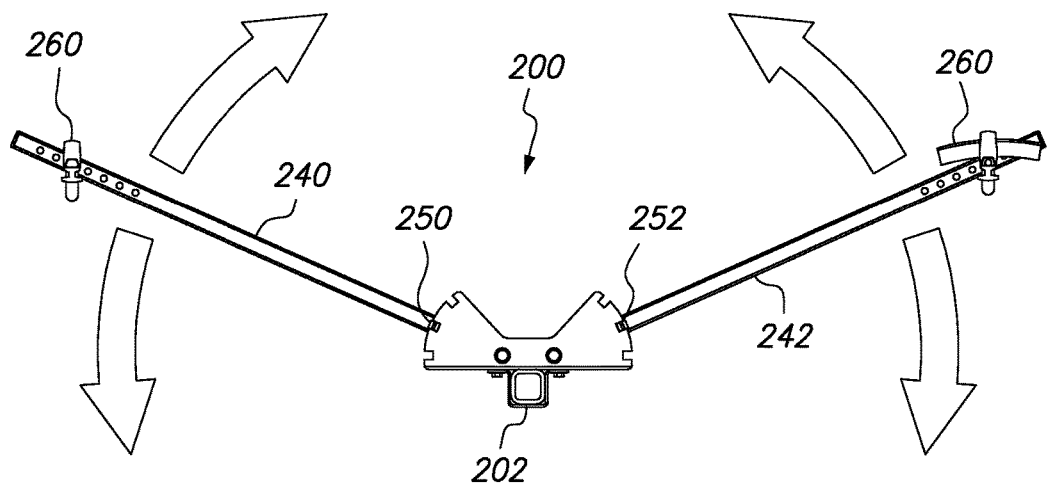
FIG. 25 is a front perspective view of the carrier of the embodiment of FIG. 26 in another adjusted position.
Figure 26:
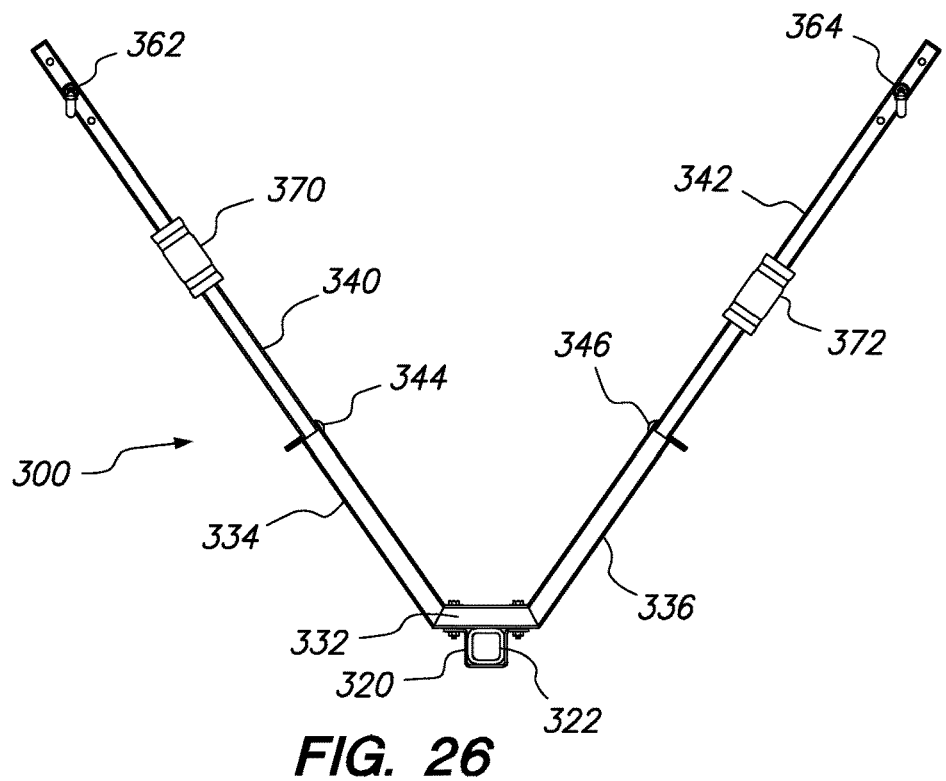
FIG. 26 is a front perspective view of another embodiment of the present invention of a hitch mounted carrier.
Figure 27:
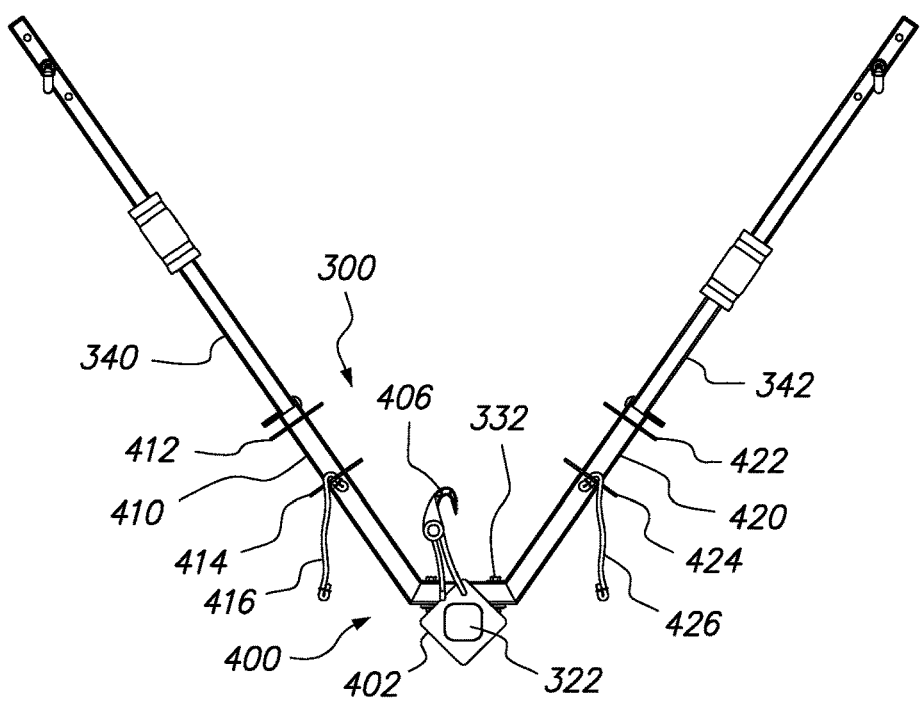
FIG. 27 is a front view of a three point securing mechanism.
Figure 28:
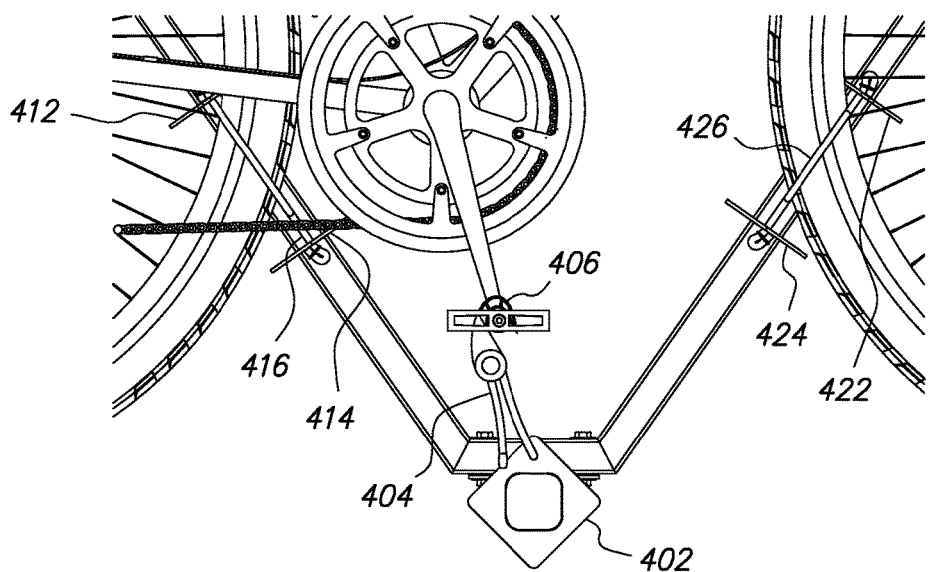
FIG. 28 is an enlarged view of a lower securing mechanism.
Figure 29:
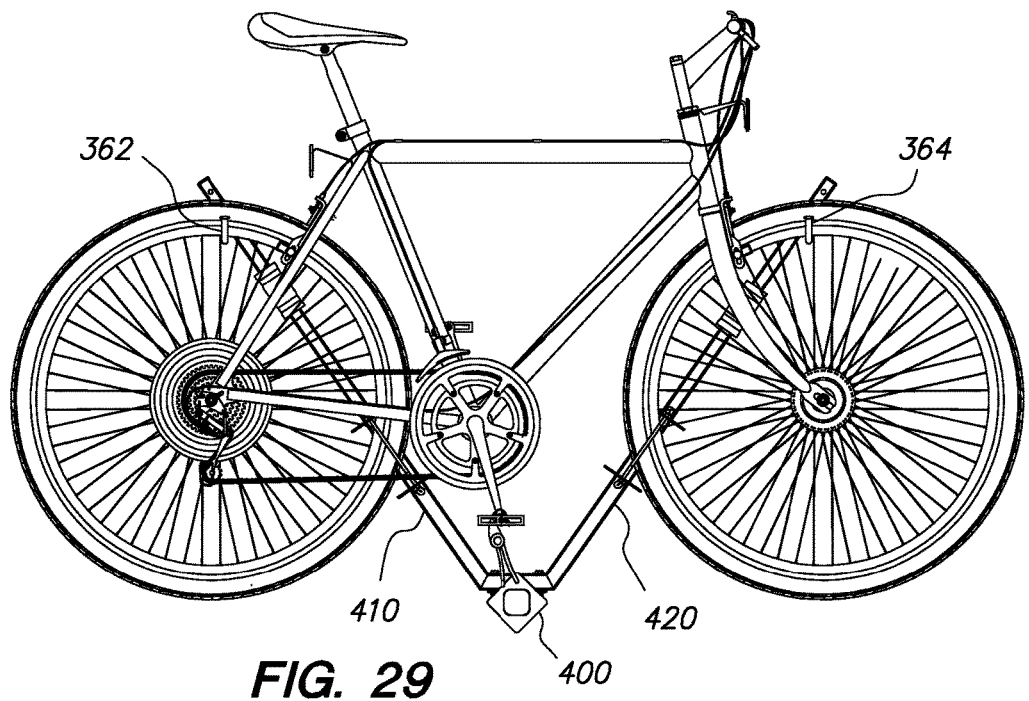
FIG. 29 is a front perspective view of bicycle secured by the three point securing mechanism of FIGS. 27 and 28.

A preferred embodiment of the present invention particularly adaptable for fastening a bicycle carrier to a hitch receiver is illustrated in FIGS. 24-25. Bicycle carrier 200 of this embodiment uses a hat clamp 202 to attach bracket 220 to a hitch receiver on a vehicle which extend into wing portions 222, 224 extending on each side of bracket 220. Notches 226, 228, 230, 232, 234, 236 are formed in wing portions 222, 224. Additional notches may be provided as well. Arm members 240, 242 are pivotally mounted to the bracket 220 to pivot upward and downward in a vertical plane relative to the bracket 220. Detents 250, 252 are spring mounted on member members 240, 242. It is to be expressly understood that the detents can be removable or otherwise mounted to the member members to engage and disengage from the notches in the wing portions 222, 224. Bicycle clamping mechanisms 260, 262 are adjustably mounted to the upper ends of the member members 240, 242. The position of the bicycle clamping mechanisms can be changed to adjust for different sizes of bicycle frames.

In use, the detents 250, 252 are released from notches to allow the member members to pivot upward or downward to adjust the distance between the bicycle clamping mechanisms. As shown in FIG. 25, arm members 240, 242 are pivoted to the desired position and the bicycle clamping mechanisms 260, 262 are adjusted to the desired position. The bicycle is then secured to the carrier 200 by the clamping mechanisms 250, 252.

Alternative preferred embodiments of the present invention are illustrated in FIGS. 26-31. Bicycle carrier 300 shown in FIGS. 26-27 of this preferred embodiment include bracket 330 which is secured to shank 322 by clamp 320. The bracket 330 includes base member 332 with angular extending members 334, 336. Adjustable arm members 340, 342 telescope within the angular extending members 334, 336. The adjustable arm members 340, 342 are secured relative to members 334, 336 by pins 346. The adjustable arm members include a series of spaced holes for receiving pins 346 so that the length of the member members can be adjusted. The carrier also includes bicycle clamping mechanisms 362, 364 and bumpers 370, 372 similar to the bicycle clamping mechanism and bumpers discussed in earlier embodiments.

A preferred alternative embodiment of the present invention includes an innovative bicycle securing mechanism. One embodiment of these bicycle securing mechanisms is disclosed in FIGS. 28-29. Lower bicycle securing mechanism 400, as shown in FIGS. 23, 24 secure the lower portion of the bicycle to the bicycle carrier. Lower bicycle securing mechanism 400 includes collar 402 that slides onto the shank 322. The collar may be loose on the shank, secured to the shank or even mounted onto the bracket 330. Elastic cord 404 is attached to the collar 402 through holes formed in the collar. Hook member 406 is attached to the elastic cord 404. The hook member 406 engages over the pedal stem of the bicycle to hold the lower portion of the bicycle securely to the carrier 300. The length of the elastic cord is such that there is tension in the cord when the hook member engages the pedal stem. An additional securing mechanism 400 can be installed on the opposing side of the carrier to secure an additional bicycle.

Bicycle wheel securing mechanisms 410, 420 secure the wheels of the bicycle to the carrier to prevent them from articulating relative to the carrier. The securing mechanisms 410, 420 include collars 412, 414, 422, 424 mounted onto angled member members 334, 336. These collars may be loose or secured to the angled member members. Elastic cords 416, 426 are secured to the lower collars 412, 422 respectively. Once the bicycle is mounted onto the carrier 300, the cords 416, 426 are secured over the bicycle wheels and engaged with the upper collars 414, 424. This prevents the wheels from articulating relative to the bicycle carrier during transport.

While the bicycle securing mechanisms were discussed with the bicycle carrier embodiment 300, it is to be expressly understood that these mechanisms may be used with any type of bicycle carrier such as those described above and with other embodiments as well.

Figure 30:
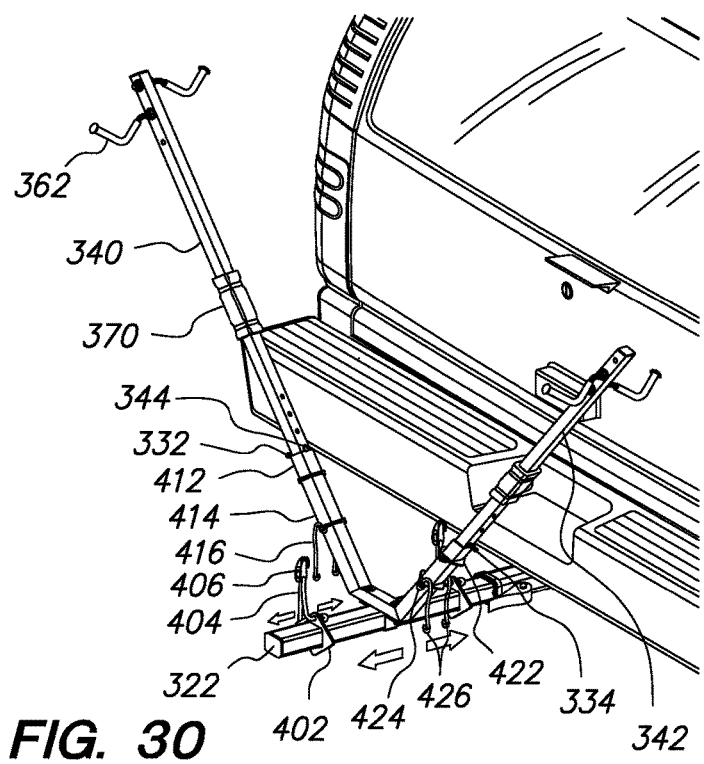
FIG. 30 is a perspective view of a securing mechanism of FIGS. 27 and 28.
Figure 31:
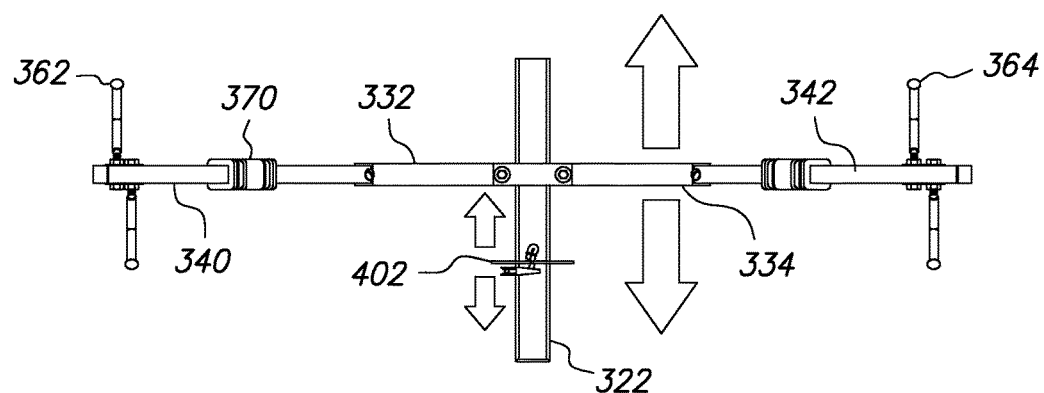
FIG. 31 is a top perspective view of the securing mechanism of FIG. 30.
Figure 32:
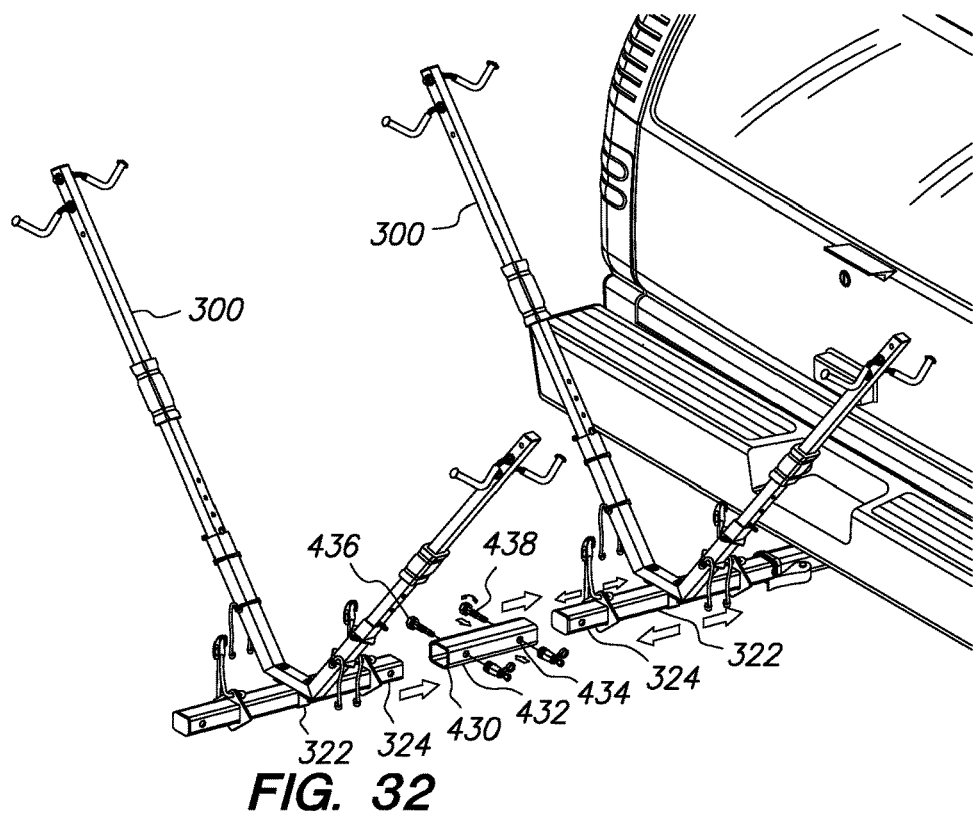
FIG. 32 is an exploded perspective view of an extended bicycle carrier system.
Figure 33:
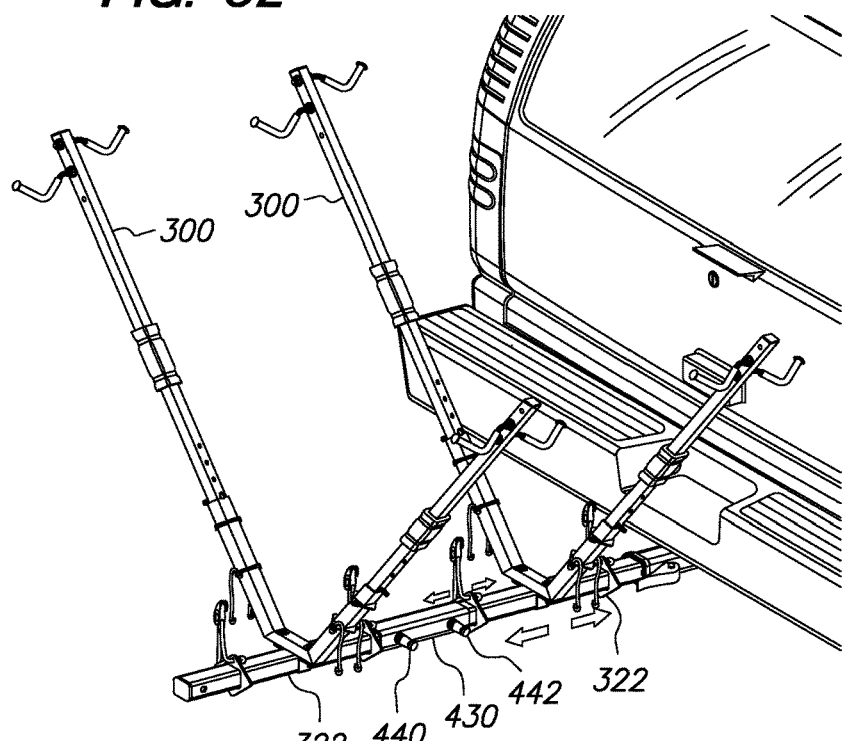
FIG. 33 is a perspective view of the system of FIG. 32.
Figure 34:
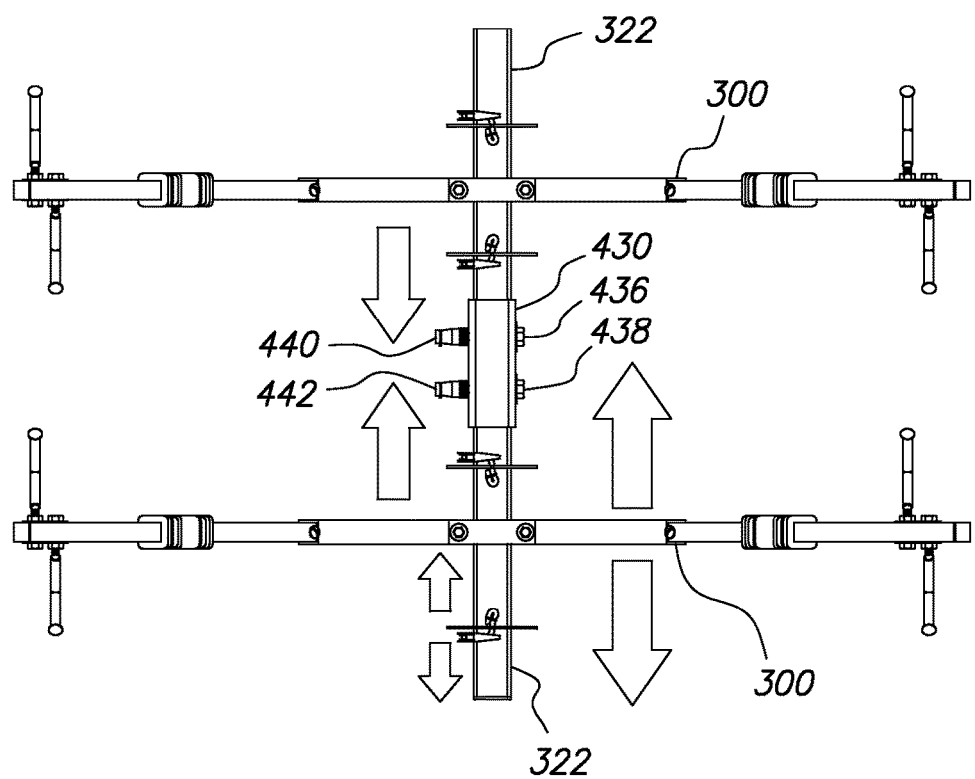
FIG. 34 is a top view of the system in FIG. 33.

As shown in FIGS. 30 and 32, the bicycle carrier 300 may be easily adjusted along the length of the shank 322. This enables the carrier to be fitted to any particular vehicle configuration. For instance, some SUVs include a tailgate mounted spare tire while others do not. The carrier can be adjusted to accommodate either situation. Also, the collars for the lower bicycle securing mechanism can also be easily adjusted. Further, the bicycle securing mechanisms that are discussed above can be mounted on both sides of the bicycle carrier to allow two bicycles to be carried.

Another preferred embodiment of the present invention is illustrated in FIGS. 30-34. This preferred embodiment includes the carrier system 300 as discussed above. The carrier of this embodiment also includes an extension shank 430. The extension shank includes two spaced holes 432, 434 extending crosswise through the shank 430. Pins 436, 438 are insertable through the holes 432, 434. The extension shank 430 engages over shank 322 of carrier 300 with pin 436 is insertable into hole 432 that is aligned with hole 324 on shank 322. It is to be noted that the extension shank 430 can also be sized to slide within shank 322. The pins 436, 438 may be bolts or preferably securing pins with resilient inner nuts as disclosed in U.S. Pat. No. 6,609,725, incorporated herein by reference.

A second bicycle carrier system 300 is then mounted to extension shank 430. The shank 322 of the second carrier 300 slides into or over extension shank 430 until hole 324 is aligned with hole 434. Pin 438 is inserted through the holes to secure the shanks to one another. Thus, two bicycle carrier systems can be mounted to a vehicle that can carry up to four bicycles. Additional extension shanks can be used to add even more bicycle carrier systems to the vehicle.

While the extension shanks 430 were discussed with the bicycle carrier embodiment 300, it is to be expressly understood that these extension shanks may be used with any type of bicycle carrier such as those described above and with other embodiments as well.

It is to be expressly understood that other embodiments are considered to be within the scope of the present invention as set forth in the claims. For example, the carrier systems may be used with a single or dual shank carrier system such as those disclosed in U.S. patent application Ser. No. 09/683,820 incorporated herein by reference. Also, each carrier could be mounted on other vehicle surfaces other than those specifically illustrated or described. For example, the adjustable carrier systems shown on a back of vehicle or trailer could be secured to a vehicle roof surface, a cargo bed or other vehicle or trailer surface.

Moreover, component configurations and combinations of embodiments may diverge from specifications shown and described. For example, base plates may be round, oval, irregular or any other configuration deployable for mounting or positioning functions contemplated herein. Alternatively, swivel bases shown in a circular shapes may have linear perimeters and arm members may be round as well as the square tubes shown in the drawings. In alternative embodiments to those specified above, various base plates, mounting mechanisms and bars as specified may employ configurations and combinations that are not illustrated and described in detail but nonetheless encompassed by the language and claimed and supported in this disclosure. Thus, the scope of the present invention includes various substitutions and assemblies among the versatile and portable carrier systems beyond the particular embodiments illustrated and specified herein.

It is therefore contemplated that other embodiments not illustrated in the drawings or described herein are considered to be within the scope of the present invention as set forth in the claims. Accordingly, configurations and combinations of the components of the carriers shown and described not specifically shown may diverge from those claimed and specified herein. The scope of the present invention thus includes any equivalent configuration or combination of the embodiments described and elements claimed.

What is claimed is:

1. A carrier for transporting cargo on a vehicle wherein the carrier comprises:
   a base member having a top surface and a bottom surface where said bottom surface is configured for attachment to a corresponding rail of the vehicle;
   a swivel base mounting member attachable to the top surface of the base member and
   two arm members detachably secured to the swivel base mounting member, wherein
   the two arm members extend outwardly from the top surface of the mounting member and where said mounting member can change an angle between the two arm members relative to the base-member; and
   where said swivel base mounting member can rotate the arm members around a central rotational axis such that the center of gravity of the two arm members is in unison orbit around a substantially perpendicular axis relative to the base member.

2. The carrier of claim 1, wherein the base plate further comprises:
   one or more holes for receiving a bolt detachably engageable with a corresponding vehicle surface; and
   upwardly angled flanges extending from opposing sides of the base plate.

3. The carrier of claim 1, wherein the base plate further comprises one or more notches.

4. The carrier of claim 1, further comprising at least one hat bracket attached to the bottom surface of the base plate, wherein the at least one hat bracket is configured to receive a corresponding bar such that the hat bracket and the bar are seated in mated engagement when the hat bracket is fastened to the bottom surface of the base plate.

5. The carrier of claim 4, wherein the at least one hat bracket comprises two hat brackets.

6. The carrier of claim 1, wherein the vehicle has a bed and further comprising
   a bar for mounting in the bed of the vehicle such that
   the bar is seated against the top surface of the mounting member and between the two arm members and thereby securing the carrier within the bed of the vehicle.

7. The carrier of claim 1, wherein the mounting member comprises a tilt bracket for pivoting in varying degrees each of the two arm members relative to the base plate.

8. The carrier of claim 1, wherein the two arm members have a series of spaced holes.

9. The carrier of claim 1, wherein the two arm members are comprised of telescoping sections and further comprising pins sized to be received in the series of spaced holes for fastening the telescoping sections in fixed positions.

10. The carrier of claim 1, further comprising an articulating mechanism for pivoting the arm members to adjust the angle between the two arm members.

11. The carrier of claim 10, wherein the two arm members comprise telescoping members and a fastener for securing the telescoping members in fixed positions.

12. The carrier of claim 1, wherein the two arm members further comprise a fastener for detachably securing the cargo.

13. The carrier of claim 10, further comprising a mounting bar for attachment to a surface of a vehicle wherein the mounting bar has a tilt bracket between a first and a second end of said mounting bar such that a section of the bar between the tilt bracket and the first end may be pivoted to a position forming a perpendicular angle relative to a section of the bar between the tilt bracket and the second end.

14. The carrier of claim 10, wherein the cargo is a cycle and the fastening mechanism comprises a wheel retainer to prevent rotation of a wheel of the cycle.

15. The carrier of claim 1 where said rail is a roof top rail.

16. The carrier of claim 1 where said rail is a truck bed side sill.

17. A carrier for transporting cargo on a vehicle, comprising:
   at least one mounting member configured for attachment to a rail where said mounting member is a swivel base mounting member;

two arm members extending outwardly at an angle from the mounting member;

said two arm members are detachably secured to the swivel base mounting member, wherein the two arm members extend outwardly from the top surface of the mounting member and where said mounting member can change an angle between the two arm members relative to the base-member;

at least one fastening mechanism for attaching the cargo to the carrier; and where said swivel base mounting member can rotate the arm members around a central rotational axis such that the center of gravity of the two arm members is in unison orbit around a substantially perpendicular axis relative to the base member.

18. The carrier of claim 17, wherein said mounting member has a pivoting mechanism to pivot the arm members to form various angles.

19. The carrier of claim 18, wherein the two arm members comprise telescoping members and a fastener for securing the telescoping members in fixed positions.

20. The carrier of claim 17 where said rail is a roof top rail.

21. The carrier of claim 17 where said rail is a truck bed side sill.

* * * * *